US008825451B2

(12) United States Patent
VanGilder et al.

(10) Patent No.: US 8,825,451 B2
(45) Date of Patent: Sep. 2, 2014

(54) SYSTEM AND METHODS FOR RACK COOLING ANALYSIS

(75) Inventors: James W. VanGilder, Pepperell, MA (US); Xuanhang Zhang, Tewksbury, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 165 days.

(21) Appl. No.: 12/970,605

(22) Filed: Dec. 16, 2010

(65) Prior Publication Data
US 2012/0158387 A1    Jun. 21, 2012

(51) Int. Cl.
| G06F 17/50 | (2006.01) |
| G06F 7/60 | (2006.01) |
| G06F 17/10 | (2006.01) |
| G06G 7/48 | (2006.01) |
| H05K 7/20 | (2006.01) |
| G06F 1/20 | (2006.01) |
| H05K 9/00 | (2006.01) |

(52) U.S. Cl.
CPC .............. G06F 17/5009 (2013.01); *G06F 1/20* (2013.01); H05K 7/20836 (2013.01); *H05K 9/0041* (2013.01); *G06F 2217/80* (2013.01)
USPC ....................... 703/1; 703/2; 703/6

(58) Field of Classification Search
CPC ................. G06F 17/50; H05K 7/20
USPC ..................................... 703/1, 2, 6
See application file for complete search history.

(56) References Cited

U.S. PATENT DOCUMENTS

| 4,823,290 A | 4/1989 | Fasack et al. |
| 5,153,837 A | 10/1992 | Shaffer et al. |
| 5,216,623 A | 6/1993 | Barrett et al. |
| 5,367,670 A | 11/1994 | Ward et al. |
| 5,404,136 A | 4/1995 | Marsden |
| 5,462,225 A | 10/1995 | Massara et al. |

(Continued)

FOREIGN PATENT DOCUMENTS

| WO | 2006119248 A2 | 11/2006 |
| WO | 2006124240 A2 | 11/2006 |
| WO | 2007095144 A2 | 8/2007 |
| WO | 2009/014893 A1 | 1/2009 |

OTHER PUBLICATIONS

"Case Study, Application of TileFlow to Improve Cooling in a Data Center," Innovative Research, Inc., 2004.

(Continued)

*Primary Examiner* — Aniss Chad
(74) *Attorney, Agent, or Firm* — Lando & Anastasi LLP

(57) ABSTRACT

According to at least one embodiment, a computer-implemented method for modeling cooling performance is provided. The method includes acts of receiving, by a computer, input data from a storage device, the input data including data related to physical structures within at least one equipment rack, selecting, based on the data related to physical structures, at least one first equation of a plurality of predetermined equations that describe pressure values in a plurality of spaces within the at least one equipment rack, determining pressure values in identified spaces of the plurality of spaces by solving the at least one first equation using the input data, determining airflow values between identified spaces by calculating a difference between the pressure values and storing, on the storage device, the airflow values as equipment rack airflow values within the at least one equipment rack.

18 Claims, 18 Drawing Sheets

(56) References Cited

U.S. PATENT DOCUMENTS

| | | | |
|---|---|---|---|
| 5,528,507 A | 6/1996 | McNamara et al. | |
| 5,581,478 A | 12/1996 | Cruse et al. | |
| 5,682,949 A | 11/1997 | Ratcliffe et al. | |
| 5,845,090 A | 12/1998 | Collins, III et al. | |
| 5,972,196 A | 10/1999 | Murphy et al. | |
| 5,974,237 A | 10/1999 | Shurmer et al. | |
| 5,978,594 A | 11/1999 | Bonnell et al. | |
| 5,978,912 A | 11/1999 | Rakavy et al. | |
| 5,982,652 A | 11/1999 | Simonelli et al. | |
| 5,984,144 A | 11/1999 | Wyatt | |
| 5,987,614 A | 11/1999 | Mitchell et al. | |
| 5,995,729 A | 11/1999 | Hirosawa et al. | |
| 6,721,672 B2 | 4/2004 | Spitaels et al. | |
| 6,795,928 B2 | 9/2004 | Bradley et al. | |
| 6,804,616 B2 | 10/2004 | Bodas | |
| 6,859,882 B2 | 2/2005 | Fung | |
| 6,862,179 B2 | 3/2005 | Beitelmal et al. | |
| 6,881,142 B1 | 4/2005 | Nair | |
| 6,964,539 B2 | 11/2005 | Bradley et al. | |
| 6,967,283 B2 | 11/2005 | Rasmussen et al. | |
| 7,020,586 B2 | 3/2006 | Snevely | |
| 7,031,870 B2 | 4/2006 | Sharma et al. | |
| 7,032,119 B2 | 4/2006 | Fung | |
| 7,033,267 B2 | 4/2006 | Rasmussen | |
| 7,051,946 B2 | 5/2006 | Bash et al. | |
| 7,085,133 B2 | 8/2006 | Hall | |
| 7,112,131 B2 | 9/2006 | Rasmussen et al. | |
| 7,146,353 B2 | 12/2006 | Garg et al. | |
| 7,148,796 B2 | 12/2006 | Joy et al. | |
| 7,197,433 B2 | 3/2007 | Patel et al. | |
| 7,313,503 B2 | 12/2007 | Nakagawa et al. | |
| 7,315,448 B1 | 1/2008 | Bash et al. | |
| 7,365,973 B2 | 4/2008 | Rasmussen et al. | |
| 7,366,632 B2 | 4/2008 | Hamann et al. | |
| 7,558,649 B1 | 7/2009 | Sharma et al. | |
| 7,568,360 B1 | 8/2009 | Bash et al. | |
| 7,596,476 B2 * | 9/2009 | Rasmussen et al. | 703/2 |
| 7,620,480 B2 | 11/2009 | Patel et al. | |
| 7,726,144 B2 | 6/2010 | Larson et al. | |
| 7,832,925 B2 * | 11/2010 | Archibald et al. | 374/29 |
| 7,881,910 B2 * | 2/2011 | Rasmussen et al. | 703/1 |
| 7,885,795 B2 * | 2/2011 | Rasmussen et al. | 703/5 |
| 7,908,126 B2 | 3/2011 | Bahel et al. | |
| 7,975,156 B2 | 7/2011 | Artman et al. | |
| 7,979,250 B2 | 7/2011 | Archibald et al. | |
| 7,991,592 B2 * | 8/2011 | VanGilder et al. | 703/1 |
| 8,155,922 B2 | 4/2012 | Loucks | |
| 8,219,362 B2 | 7/2012 | Shrivastava et al. | |
| 8,229,713 B2 * | 7/2012 | Hamann et al. | 703/1 |
| 8,244,502 B2 | 8/2012 | Hamann et al. | |
| 8,249,825 B2 | 8/2012 | VanGilder et al. | |
| 8,315,841 B2 * | 11/2012 | Rasmussen et al. | 703/1 |
| 8,425,287 B2 | 4/2013 | Wexler | |
| 8,473,265 B2 | 6/2013 | Hlasny et al. | |
| 8,509,959 B2 | 8/2013 | Zhang et al. | |
| 2001/0005894 A1 | 6/2001 | Fukui | |
| 2001/0042616 A1 | 11/2001 | Baer | |
| 2001/0047213 A1 | 11/2001 | Sepe | |
| 2001/0047410 A1 | 11/2001 | Defosse | |
| 2001/0052006 A1 | 12/2001 | Barker et al. | |
| 2001/0055965 A1 | 12/2001 | Delp et al. | |
| 2002/0004912 A1 | 1/2002 | Fung | |
| 2002/0023258 A1 | 2/2002 | Elwahab et al. | |
| 2002/0043969 A1 | 4/2002 | Duncan et al. | |
| 2002/0055909 A1 | 5/2002 | Fung et al. | |
| 2002/0059804 A1 | 5/2002 | Spinazzola et al. | |
| 2002/0062454 A1 | 5/2002 | Fung | |
| 2002/0072868 A1 | 6/2002 | Bartone et al. | |
| 2002/0124081 A1 | 9/2002 | Primm et al. | |
| 2002/0129355 A1 | 9/2002 | Velten et al. | |
| 2002/0134567 A1 | 9/2002 | Rasmussen et al. | |
| 2002/0149911 A1 | 10/2002 | Bishop et al. | |
| 2002/0161885 A1 | 10/2002 | Childers et al. | |
| 2003/0019221 A1 | 1/2003 | Rossi et al. | |
| 2003/0033550 A1 | 2/2003 | Kuiawa et al. | |
| 2003/0042004 A1 | 3/2003 | Novotny et al. | |
| 2003/0084357 A1 | 5/2003 | Bresniker et al. | |
| 2003/0084358 A1 | 5/2003 | Bresniker et al. | |
| 2003/0084359 A1 | 5/2003 | Bresniker et al. | |
| 2003/0115000 A1 | 6/2003 | Bodas | |
| 2003/0115024 A1 | 6/2003 | Snevely | |
| 2003/0121689 A1 | 7/2003 | Rasmussen et al. | |
| 2003/0158718 A1 | 8/2003 | Nakagawa et al. | |
| 2003/0188208 A1 | 10/2003 | Fung | |
| 2003/0193777 A1 | 10/2003 | Friedrich et al. | |
| 2003/0196126 A1 | 10/2003 | Fung | |
| 2003/0200473 A1 | 10/2003 | Fung | |
| 2003/0204756 A1 | 10/2003 | Ransom et al. | |
| 2003/0236822 A1 | 12/2003 | Graupner et al. | |
| 2004/0003266 A1 | 1/2004 | Moshir et al. | |
| 2004/0010569 A1 | 1/2004 | Thomas et al. | |
| 2004/0031280 A1 | 2/2004 | Martin et al. | |
| 2004/0065104 A1 | 4/2004 | Bash et al. | |
| 2004/0075343 A1 | 4/2004 | Wareham et al. | |
| 2004/0075984 A1 | 4/2004 | Bash et al. | |
| 2004/0083012 A1 | 4/2004 | Miller | |
| 2004/0089009 A1 * | 5/2004 | Bash et al. | 62/259.2 |
| 2004/0120331 A1 * | 6/2004 | Rhine et al. | 370/408 |
| 2004/0155526 A1 | 8/2004 | Naden et al. | |
| 2004/0163001 A1 | 8/2004 | Bodas | |
| 2004/0230848 A1 | 11/2004 | Mayo et al. | |
| 2004/0240514 A1 | 12/2004 | Bash et al. | |
| 2004/0262409 A1 | 12/2004 | Crippen et al. | |
| 2005/0023363 A1 | 2/2005 | Sharma et al. | |
| 2005/0055590 A1 | 3/2005 | Farkas et al. | |
| 2005/0108582 A1 | 5/2005 | Fung | |
| 2005/0177755 A1 | 8/2005 | Fung | |
| 2005/0228618 A1 | 10/2005 | Patel et al. | |
| 2005/0235671 A1 | 10/2005 | Belady et al. | |
| 2005/0251802 A1 | 11/2005 | Bozek et al. | |
| 2005/0267639 A1 | 12/2005 | Sharma et al. | |
| 2006/0072262 A1 | 4/2006 | Paik et al. | |
| 2006/0080001 A1 | 4/2006 | Bash et al. | |
| 2006/0081545 A1 | 4/2006 | Rassmussen et al. | |
| 2006/0082263 A1 | 4/2006 | Rimler et al. | |
| 2006/0112286 A1 | 5/2006 | Whalley et al. | |
| 2006/0168975 A1 | 8/2006 | Malone et al. | |
| 2006/0214014 A1 | 9/2006 | Bash et al. | |
| 2006/0260338 A1 | 11/2006 | VanGilder et al. | |
| 2006/0276121 A1 | 12/2006 | Rasmussen | |
| 2007/0038414 A1 | 2/2007 | Rasmussen et al. | |
| 2007/0055409 A1 | 3/2007 | Rasmussen et al. | |
| 2007/0078635 A1 | 4/2007 | Rasmussen et al. | |
| 2007/0129000 A1 | 6/2007 | Rasmussen et al. | |
| 2007/0150215 A1 | 6/2007 | Spitaels et al. | |
| 2007/0150584 A1 | 6/2007 | Srinivasan | |
| 2007/0163748 A1 | 7/2007 | Rasmussen et al. | |
| 2007/0165377 A1 | 7/2007 | Rasmussen et al. | |
| 2007/0167125 A1 | 7/2007 | Rasmussen et al. | |
| 2007/0174024 A1 | 7/2007 | Rasmussen et al. | |
| 2007/0271475 A1 | 11/2007 | Hataski et al. | |
| 2008/0002364 A1 | 1/2008 | Campbell et al. | |
| 2008/0004837 A1 | 1/2008 | Zwinger et al. | |
| 2008/0041076 A1 | 2/2008 | Tutunoglu et al. | |
| 2008/0055850 A1 * | 3/2008 | Carlson et al. | 361/695 |
| 2008/0104985 A1 | 5/2008 | Carlsen | |
| 2008/0105412 A1 | 5/2008 | Carlsen et al. | |
| 2008/0174954 A1 * | 7/2008 | VanGilder et al. | 361/687 |
| 2008/0198549 A1 | 8/2008 | Rasmussen et al. | |
| 2009/0121547 A1 | 5/2009 | Paik et al. | |
| 2009/0138313 A1 | 5/2009 | Morgan et al. | |
| 2009/0138888 A1 | 5/2009 | Shah et al. | |
| 2009/0150123 A1 | 6/2009 | Archibald et al. | |
| 2009/0168345 A1 * | 7/2009 | Martini | 361/691 |
| 2009/0205416 A1 | 8/2009 | Campbell et al. | |
| 2009/0207564 A1 | 8/2009 | Campbell et al. | |
| 2009/0223234 A1 | 9/2009 | Campbell et al. | |
| 2009/0259343 A1 | 10/2009 | Rasmussen et al. | |
| 2009/0309570 A1 | 12/2009 | Lehmann et al. | |
| 2009/0326879 A1 | 12/2009 | Hamann et al. | |
| 2009/0326884 A1 | 12/2009 | Amemiya et al. | |
| 2010/0106464 A1 | 4/2010 | Hlasny et al. | |
| 2010/0211669 A1 | 8/2010 | Dalgas et al. | |
| 2010/0256959 A1 | 10/2010 | VanGilder et al. | |

(56) References Cited

U.S. PATENT DOCUMENTS

| | | |
|---|---|---|
| 2010/0286956 A1 | 11/2010 | VanGilder et al. |
| 2010/0287018 A1 | 11/2010 | Shrivastava et al. |
| 2011/0040529 A1 | 2/2011 | Hamann et al. |
| 2011/0213508 A1 | 9/2011 | Mandagere et al. |
| 2011/0246147 A1* | 10/2011 | Rasmussen et al. ............... 703/2 |
| 2012/0041569 A1* | 2/2012 | Zhang et al. ................... 700/17 |
| 2012/0071992 A1 | 3/2012 | VanGilder et al. |
| 2012/0158387 A1 | 6/2012 | VanGilder et al. |
| 2012/0170205 A1 | 7/2012 | Healey et al. |
| 2012/0221872 A1 | 8/2012 | Artman et al. |
| 2013/0006426 A1 | 1/2013 | Healey et al. |
| 2013/0139530 A1 | 6/2013 | Tutunoglu et al. |

OTHER PUBLICATIONS

"Essential Cooling System Requirements for Next Generation Data Centers," White Paper #5, Revision 3, 2003 American Power Conversion, Rev 2002-3, pp. 1-10.

"Management Strategy for Network Critical Physical Infrastructure", White Paper #100, pp. 110, American Power Conversion, Dec. 15, 2003, published on World Wide Web.

Abdlmonem H. Beitelmal et al.: "Thermo-Fluids Provisioning of a High Performance High Density Data Center" Distributed and Parallel Databases, Kluwer Academic Publishers, BO, vol. 21, No. 2-3, Apr. 22, 2006, pp. 227-238, XP019499843, ISSN: 1573-7578.

Bash, C. E. et al.: "Balance of Power: Dynamic Thermal Management for Internet Data Centers", IEEE Internet Computing , Jan. 1, 2005, pp. 42-49, vol. 9, No. 1, IEEE Service Center, New York, NY.

Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.

Ehsan Pakabaznia et al., "Miminizing data center cooling and server power costs", Proceedings of the 14th ACM/IEEE International Symposium on Low Power Electronics and Design, ISLPED '09, Jan. 1, 2009, p. 145, XP55015368, New York, New York, USA, DOI: 10.1145/1594233.1594268, ISBN: 978-1-60-558684-7.

Herrlin, M.K., "Rack Cooling Effectiveness in Data Centers and Telecom Central Offices: The Rack Cooling Index (RCI)," ASHRAE Transaction, 2005, pp. 725-731, vol. 111(2).

Innovative Research, Inc., http://web.archive.org/web/20051221005029/http://www.inres.com/, Dec. 21, 2005, published on World Wide Web.

International Search Report and Written Opinion of the International Searching Authority from corresponding PCT/US2011/065071 mailed Oct. 11, 2012.

Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008, pp. 1129-1142, ISSN: 0018-9340, DOI: 10.1109/TC.2008.52.

Karki et al., "Techniques for controlling airflow distribution in raised-floor data centers," ASME 2003.

N. Rasmussen, "Calculating Total Cooling Requirements for Data Centers", White Paper #25, pp. 1-8, American Power Conversion, May 20, 2004, published on World Wide Web.

N. Rasmussen, "Cooling Strategies for Ultra-High Density Racks and Blade Servers", White Paper #46, pp. 1-22, American Power Conversion, Mar. 29, 2005, published on World Wide Web.

N. Rasmussen, "Strategies for Deploying Blade Servers in Existing Data Centers", White Paper #125, pp. 1-14, American Power Conversion, Mar. 29, 2005, published on World Wide Web.

Neil Rasmussen, "Air Distribution Architecture Options for Mission Critical Facilities," White Paper #55, Revision 1, 2003 American Power Conversion, Rev 2003-0, pp. 1-13.

Neil Rasmussen, "Avoidable Mistakes that Compromise Cooling Performance in Data Centers and Network Rooms," White Paper #49, 2003 American Power Conversion, Rev 2003-0, pp. 1-15.

Neil Rasmussen, "Cooling Options for Rack Equipment with Side-to-Side Airflow," White Paper #50, 2004 American Power Conversion, Rev 2004-0, pp. 1-14.

Neil Rasmussen, "Guidelines for Specification of Data Center Power Density," White Paper #120, 2005 American Power Conversion, Rev 2005-0, pp. 1-21.

Pakbaznia, E.; Ghasemazar, M.; Pedram, M.:, "Temperature-aware dynamic resource provisioning in a power-optimized datacenter," Design, Automation & Test in Europe Conference & Exhibition (DATE), 2010, vol., No., pp. 124-129, Mar. 8-12, 2010.

Pinheiro, Eduardo, "Load Balancing and Unbalancing for Power and Performance in Cluster-Based Systems," Internet Citation, May 1, 2001 URL:http://research.ac.upc.es/pact01/colp/paper04.pdf, retrieved on Nov. 17, 2003.

Refai-Ahmed G. et al., "Analysis of flow distribution in power supply using flow network modeling (FNM)", Thermal and Thermomechanical Phenomena in Electronic Systems, 2000, IT HERM 2000, The Seventh Intersociety Conference on May 23-26, 2000, Piscataway, NJ, USA, IEEE, Piscataway, NJ, USA, vol. 1, May 23, 2000, pp. 90-98, ISBN: 978-0-7803-5912-3.

Sharma, R.K, Bash, C.E., and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.

Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.

Shrivastava S.K. et al., "A flow-network model for predicting rack cooling in containment systems", Proceedings of the ASME Interpack Conference—2009: Presented at 2009 ASME Interpack Conference, Jul. 19-23, 2009, San Francisco, California, USA, vol. 2, Jul. 19, 2009, pp. 785-791.

Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lake Buena Vista, Florida, USA, vol. 13: New Del, Vol. 13, Jan. 1, 2009, pp. 41-50, DOI: 10.1115/IMECE2009-10806, ISBN: 978-0-7918-4386-4.

Vanessa Lopez et al, "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010, pp. 1-8, XP031702357.

VanGilder et al., "Airflow Uniformity thourhg Perforated Tiles in a Raised-Floor Data Center", White Paper 121, Jul. 17-22, 2005, 10 pages.

VanGilder, James W. et al., "Caputure index: an airflow-based rack cooling performance metric," 2007, ASHRAE Transactions, vol. 113, pp. 126-136.

VanGilder, James W. et al., "Real-Time prediction of rack-cooling performance," 2006, ASHRAE Transactions, vol. 112, pp. 151-162.

VanGilder, James, W., et al., "Real-time prediction of rack-cooling performance," 2006, ASHRAE Transactions, vol. 112, pp. 151-162.

VanGilder, James, W., et al., "Capture index: an airflow-based rack cooling performance metric," 2007, ASHRAE Transactions, vol. 113, pp. 126-136.

Healey, C., et al., "Potential-Flow Modeling for Data Center Applications," Proceedings of the ASME 2011 Pacific Rim Technical Conference & Exposition on Packaging and Integration of Electronic and Photonic Systems, IPACK2011-52136, Jul. 6-8, 2011.

Chen, Q.and Srebric, J., "Simplified Diffuser Boundary Conditions for Numerical Room Airflow Models," Final Report for ASHRAE RP-1009, Department of Architecture, Massachusetts Institute of Technology, Cambridge, MA, 2000, 181 pages.

2nd Notification of Office Action in corresponding CN 200980147253.0 dated Nov. 5, 2013.

* cited by examiner

Pressure Node Calculations for FNM Rack Airflow Tool $$P_1 = \frac{-p'_{stag}}{2\alpha_1 Q^2_{max}} \left\{ p'_{stag} + 2\alpha_{eff} Q^2_{max} - \sqrt{p'_{stag}(p'_{stag} + 4\alpha_{eff} Q^2_{max})} \right\} \quad (1)$$

$$P_2 = \frac{p'_{stag}}{2\alpha_2 Q^2_{max}} \left\{ p'_{stag} + 2\alpha_{eff} Q^2_{max} - \sqrt{p'_{stag}(p'_{stag} + 4\alpha_{eff} Q^2_{max})} \right\} \quad (2)$$

FIG. 4A

| Scenario | Front Door | Server Plane | Leakage | Rear Door | Rear Coil | P1 | P2 | $\alpha_{eff}$ |
|---|---|---|---|---|---|---|---|---|
| 1 | N | N | N | Y | N | 0 | Eqn 2 | $\dfrac{\alpha_c \alpha_{rd}}{(\sqrt{\alpha_c} + \sqrt{\alpha_{rd}})^2}$ |
| 2 | N | N | Y | Y | N | 0 | Eqn 2 | $\dfrac{\alpha_{rp} \alpha_{rd}}{\alpha_{rp} + \alpha_{rd}}$ |
| 3 | N | Y | N | Y | N | 0 | Eqn 2 | $\dfrac{(\alpha_{sp} \alpha_c)}{(\sqrt{\alpha_{sp} \alpha_c} + \sqrt{\alpha_{rd}})^2}$ |
| 4 | N | Y | Y | Y | N | 0 | Eqn 2 | $\sqrt{\alpha_{rp} \alpha_c} + \sqrt{\alpha_{sp} \alpha_c} + \sqrt{\alpha_{rd}}$ ... $\alpha_{rp,d} + \alpha_{rd}$ |
| 5 | Y | N | N | Y | N | Eqn 1 | Eqn 2 | $\dfrac{\alpha_c \alpha_{rd}}{(\sqrt{\alpha_c} + \sqrt{\alpha_{rd}})^2}$ |
| 6 | Y | N | Y | Y | N | Eqn 1 | Eqn 2 | $\dfrac{\alpha_{rp} \alpha_{sp}}{\sqrt{\alpha_{rp}} + \sqrt{\alpha_{rd}}}$ |
| 7 | Y | Y | N | Y | N | Eqn 1 | Eqn 2 | $\dfrac{\alpha_{sp} \alpha_{rp}}{\sqrt{\alpha_{sp}} + \sqrt{\alpha_{rd}}}$ |
| 8 | Y | Y | Y | Y | N | Eqn 1 | Eqn 2 | $\dfrac{\alpha_c \alpha_c \alpha_{rd}}{\sqrt{\alpha_{sp}} + (\sqrt{\alpha_{rd}} + \sqrt{\alpha_c})}$ |

| Scenario | Front Door | Server Plane | Leakage | Rear Door | Rear Coil | $P_1$ | $P_2$ | $\alpha_{eff}$ |
|---|---|---|---|---|---|---|---|---|
| 9 | N | N | N | N | N | 0 | 0 | N/A |
| 10 | N | N | Y | N | N | 0 | Eqn 2 | N/A |
| 11 | N | Y | N | N | N | 0 | 0 | N/A |
| 12 | N | Y | Y | N | N | 0 | 0 | N/A |
| 13 | Y | N | N | N | N | Eqn 1 | 0 | $\alpha_{r,a}$ |
| 14 | Y | N | Y | N | N | Eqn 1 | 0 | $\alpha_{r,a}$ |
| 15 | Y | Y | N | N | N | Eqn 1 | 0 | $\alpha_{r,a}$ |
| 16 | Y | Y | Y | N | N | Eqn 1 | 0 | $\alpha_{r,a}$ |
| 17 | N | N | N | N | Y | 0 | Eqn 2 | $\dfrac{\alpha_c}{\alpha_{r,p}\alpha_c}$ |
| 18 | N | N | Y | N | Y | 0 | Eqn 2 | $\left(\sqrt{\alpha_{r,r}}+\sqrt{\alpha_c}\right)^2$ |
| 19 | N | Y | N | N | Y | 0 | Eqn 2 | $\left(\sqrt{\alpha_{r,p}}+\sqrt{\alpha_c}\right)^2$ |

FIG. 4D

| Scenario | $\alpha_3$ | $\alpha_3'$ | $P_{3xd}'$ |
|---|---|---|---|
| 9 | N/A | N/A | N/A |
| 10 | N/A | N/A | $P_{3xd,0}$ |
| 11 | N/A | N/A | N/A |
| 12 | N/A | N/A | $P_{3xd,0}$ |
| 13 | $\alpha_{3,d}$ | N/A | $P_{3xd,0}$ |
| 14 | $\alpha_{3,d}$ | N/A | $P_{3xd,0}$ |
| 15 | $\alpha_{3,d}$ | N/A | $P_{3xd,d}$ |
| 16 | $\alpha_{3,d}$ | N/A | $P_{3xd,d}$ |
| 17 | N/A | $\dfrac{\alpha_c}{\alpha_{3,sp}/\alpha_c} \left( \dfrac{\sqrt{\alpha_{c,sp}} + \sqrt{\alpha_c}}{\sqrt{\alpha_{c,sp}} + \sqrt{\alpha_c}} \right)^2$ | $P_{3xd,d}$ |
| 18 | N/A | N/A | $P_{3xd,d}$ |
| 19 | N/A | N/A | $P_{3xd,d}$ |

FIG. 4E

| Scenario | Front Door | Server Plane | Leakage | Rear Door | Rear Coil | $P_1$ | $P_2$ | $\alpha_{eff}$ |
|---|---|---|---|---|---|---|---|---|
| 20 | N | Y | Y | N | Y | 0 | Eqn 2 | $\dfrac{\alpha_{sp}\alpha_c\alpha_l}{(\sqrt{\alpha_c\alpha_l} + \sqrt{\alpha_{sp}\alpha_l} + \sqrt{\alpha_{sp}\alpha_c})^2}$ |
| 21 | Y | N | N | N | Y | Eqn 1 | Eqn 2 | $\dfrac{\alpha_{fd}\alpha_c}{\alpha_{fd} + \alpha_c}$ |
| 22 | Y | N | Y | N | Y | Eqn 1 | Eqn 2 | $\alpha_{fd} + \dfrac{\alpha_l \alpha_c}{(\sqrt{\alpha_l} + \sqrt{\alpha_c})^2}$ |
| 23 | Y | Y | N | N | Y | Eqn 1 | Eqn 2 | $\dfrac{\alpha_{fd}\alpha_{sp}}{(\sqrt{\alpha_{sp}} + \sqrt{\alpha_c + \alpha_{fd}})^2}$ |
| 24 | Y | Y | Y | N | Y | Eqn 1 | Eqn 2 | $\alpha_{fd} + \left(\dfrac{\alpha_{sp}\alpha_c\alpha_l}{(\sqrt{\alpha_l} + \sqrt{\alpha_c})^2 + \sqrt{\alpha_{sp}}}\right)^2$ |

FIG. 5A

| Scenario | $\alpha_1$ | $\alpha_2$ | $p_{stag}$ |
|---|---|---|---|
| 20 | N/A | $\dfrac{\alpha_{sep}\alpha_c\alpha_t}{\left(\sqrt{\alpha_c\alpha_t}+\sqrt{\alpha_{sep}\alpha_c}+\sqrt{\alpha_{sep}\alpha_t}\right)^2}$ | $p_{chest}$ |
| 21 | $\dfrac{(\alpha_{f,d}+\alpha_c)^2}{\alpha_{f,d}}$ | $\dfrac{(\alpha_{f,d}+\alpha_c)^2}{\alpha_{f,d}}$ | $p_{chest}$ |
| 22 | $\dfrac{1}{\alpha_{f,d}}\left(\dfrac{\alpha_c\alpha_c}{\sqrt{\alpha_c}+\sqrt{\alpha_{f,d}}}\right)^2$ | $\left(\dfrac{\alpha_c\alpha_c}{\sqrt{\alpha_c}+\sqrt{\alpha_{f,d}}}\right)^2$ | $p_{chest}$ |
| 23 | $\dfrac{\alpha_{f,d}\alpha_{sep}}{\left(\sqrt{\alpha_{sep}}+\sqrt{\alpha_c}+\sqrt{\alpha_{f,d}}\right)^2}$ | $\dfrac{\alpha_{f,d}^2\alpha_{sep}}{\alpha_c\left(\sqrt{\alpha_{sep}}+\sqrt{\alpha_c}+\sqrt{\alpha_{f,d}}\right)^2}$ | $\dfrac{p_{chest}}{\left(K_c/\alpha_{f,d}+1\right)}$ |
| 24 | $\left(\dfrac{\alpha_{f,d}\alpha_{sep}}{\sqrt{\alpha_{sep}}+\sqrt{\alpha_c\left(\sqrt{\alpha_c}+\sqrt{\alpha_{f,d}}\right)}}\right)^2$ | $\dfrac{\alpha_{f,d}^2\alpha_{sep}}{\alpha_c\left(\sqrt{\alpha_{sep}}+\sqrt{\alpha_c\left(\sqrt{\alpha_c}+\sqrt{\alpha_{f,d}}\right)}\right)^2}$ | $\dfrac{p_{stag}}{1+\dfrac{\alpha_{f,d}}{\alpha_c}\left(\sqrt{\alpha_c}+\sqrt{\alpha_c}\right)}$ |

FIG. 5B

SYSTEM AND METHODS FOR RACK COOLING ANALYSIS

BACKGROUND

1. Field of the Invention

At least one embodiment in accordance with the present invention relates generally to systems and methods for data center management and design, and more specifically, to systems and methods for predicting cooling performance within a data center rack.

2. Discussion of Related Art

In response to the increasing demands of information-based economies, information technology networks continue to proliferate across the globe. One manifestation of this growth is the centralized network data center. A centralized network data center typically consists of various information technology equipment, collocated in a structure that provides network connectivity, electrical power and cooling capacity. Often the equipment is housed in specialized enclosures termed "racks" which integrate these connectivity, power and cooling elements. In some data center configurations, these rows are organized into hot and cool aisles to decrease the cost associated with cooling the information technology equipment. A raised floor having an air plenum beneath the floor is typically used for providing cooling air to the racks. Cool air is distributed from the air plenum to the racks through perforated tiles having open areas.

Various processes and software applications, such as the InfrastruXure® Central and the Operations Manager products available from American Power Conversion Corporation (APC) of West Kingston, R.I., have been developed to aid data center personnel in designing and maintaining efficient and effective data center configurations. These tools often guide data center personnel through activities such as designing the data center structure, positioning equipment within the data center prior to installation and repositioning equipment after construction and installation are complete. Thus, conventional tool sets provide data center personnel with a standardized and predictable design methodology.

SUMMARY OF THE INVENTION

According to at least one embodiment, a computer-implemented method for modeling cooling performance is provided. The method includes acts of receiving, by a computer, input data from a storage device, the input data including data related to physical structures within at least one equipment rack, selecting, based on the data related to physical structures, at least one first equation of a plurality of predetermined equations that describe pressure values in a plurality of spaces within the at least one equipment rack, determining pressure values in identified spaces of the plurality of spaces by solving the at least one first equation using the input data, determining airflow values between identified spaces by calculating a difference between the pressure values and storing, on the storage device, the airflow values as equipment rack airflow values within the at least one equipment rack.

In the method, the act of receiving input data may include an act of receiving input data describing at least one of a front door, a server plane, a rear door, a rear cooling coil and an inlet in the at least one equipment rack. In addition, the act of selecting the at least one first equation may include an act of selecting a plurality of equations. Further, the act of determining the pressure values may include an act of determining pressure values in identified spaces adjacent to at least one server positioned within the at least one equipment rack.

The method may further include an act of determining a predicted airflow value for at least one fan of the at least one server based on the difference between the pressure values. The method may also include an act of determining a predicted value of power delivered to the at least one fan based on the predicted airflow value for the at least one fan. Additionally, the method may include an act of determining a predicted temperature value at an inlet of the at least one server based on an airflow value for leakage of ambient air into the at least one equipment rack.

The method may further include an act of providing the predicted airflow value, the predicted value of power and the predicted temperature value to an external entity. In addition, the method may include acts of (A) determining a temperature value at an outlet of the at least one equipment rack based on the equipment rack airflow values and a temperature value at an inlet of the at least one equipment rack, (B) executing a room cooling performance model using the equipment rack airflow values and the temperature value at the outlet, (C) receiving, from the room cooling performance model, an updated temperature value at the inlet of the at least one equipment rack, (D) storing, on the storage device, the updated temperature value as the temperature value at the inlet, (E) determining whether a difference between the updated temperature value and a previous temperature value at the inlet is greater than a threshold and (F) repeating acts (A) through (E) until the difference is not greater than the threshold. Further, the method may include an act of tuning the at least one equation to compensate for resistance values located within the at least one equipment rack.

The method may further include an act of controlling at least one of a cooling device and an equipment rack in a data center based on at least one equipment rack airflow value. In addition, the method may include acts of (A) dividing the at least one equipment rack into a plurality of grid cells, (B) using a first iterative method based on the equipment rack airflow values, determine a value for airflow velocity for each of the grid cells, (C) determining an air pressure value in each of the identified spaces based on the airflow velocity, (D) using a second iterative method, determine new airflow values between the identified spaces based on the air pressure values in the identified spaces, (E) storing the new airflow values as the equipment rack airflow values within the at least one equipment rack, (F) determining whether differences between the new airflow values and previous airflow values is greater than a threshold and (G) repeating acts (B) through (F) until the differences are not greater than the threshold.

In the method, the act (A) may include an act of automatically setting a size of each of the plurality of grid cells such that at least one grid cell of the plurality of grid cells has a size different from the size of one other grid cell of the plurality of grid cells. In addition, the act of automatically setting a size may include an act of determining a size of each of the plurality of grid cells based on characteristics of the at least one equipment rack. Further, the act (B) may include an act of setting a relaxation factor for the first iterative method, and using the relaxation factor in the first iterative method.

The method may further include an act of setting a limit for a number of iterations of the first iterative method based on a completed number of iterations of the second iterative method. Furthermore, the method may include an act of increasing the limit based on an increase in the completed number of iterations of the second iterative method. Additionally, the act (D) may include an act of determining whether airflows in the at least one equipment rack satisfy a mass balance equation.

According to another embodiment, a system for modeling cooling performance is provided. The system includes a memory and a processor coupled to the memory and is configured to receive, by a computer, input data from a storage device, the input data including data related to physical structures within at least one equipment rack, select, based on the data related to physical structures, at least one first equation of a plurality of predetermined equations that describe pressure values in a plurality of spaces within the at least one equipment rack, determine pressure values in identified spaces of the plurality of spaces by solving the at least one first equation using the input data, determine airflow values between identified spaces by calculating a difference between the pressure values and store, on the storage device, the airflow values as equipment rack airflow values within the at least one equipment rack.

In the system, the input data may describe at least one of a front door, a server plane, a rear door, a rear cooling coil and an inlet in the at least one equipment rack. In addition, the at least one first equation may include a plurality of equations. Further, the identified spaces may include spaces adjacent to at least one server positioned within the at least one equipment rack. Moreover, the system may be further configured to determine a predicted airflow value for at least one fan of the at least one server based on the difference between the pressure values. Also, the system may be further configured to determine a predicted value of power delivered to the at least one fan based on the predicted airflow value for the at least one fan. Additionally, the system may be further configured to determine a predicted temperature value at an inlet of the at least one server based on an airflow value for leakage of ambient air into the at least one equipment rack. Furthermore, the system may be further configured to provide the predicted airflow value, the predicted value of power and the predicted temperature value to an external entity.

The system may be further configured to (A) determine a temperature value at an outlet of the at least one equipment rack based on the equipment rack airflow values and a temperature value at an inlet of the at least one equipment rack, (B) execute a room cooling-performance model using the equipment rack airflow values and the temperature value at the outlet, (C) receive, from the room cooling performance model, an updated temperature value at the inlet of the at least one equipment rack, (D) store, on the storage device, the updated temperature value as the temperature value at the inlet, (E) determine whether a difference between the updated temperature value and a previous temperature value at the inlet is greater than a threshold and (F) repeat acts (A) through (E) until the difference is not greater than the threshold. In addition, the system may be further configured to receive information that tunes the at least one equation to compensate for resistance values located within the at least one equipment rack. Further, the system may be further configured to control at least one of a cooling device and an equipment rack in a data center based on at least one equipment rack airflow value.

The system may also be further configured to (A) divide the at least one equipment rack into a plurality of grid cells, (B) execute a first iterative method based on the equipment rack airflow values to determine a value for airflow velocity for each of the grid cells, (C) determine an air pressure value in each of the identified spaces based on the airflow velocity, (D) execute a second iterative method to determine new airflow values between the identified spaces based on the air pressure values in the identified spaces, (E) store the new airflow values as the equipment rack airflow values within the at least one equipment rack, (F) determine whether differences between the new airflow values and previous airflow values is greater than a threshold and (G) repeat acts (B) through (F) until the differences are not greater than the threshold. The at least one grid cell of the plurality of grid cells may have a size different from a size of another grid cell of the plurality of grid cells. In addition, the plurality of grid cells may have a size based on characteristics of the at least one equipment rack. Further, the system may be further configured to set a relaxation factor for the first iterative method and use the relaxation factor in the first iterative method. Moreover, the system may be further configured to set a limit for a number of iterations of the first iterative method based on a completed number of iterations of the second iterative method. Additionally, the system may be further configured to increase the limit based on an increase in the completed number of iterations of the second iterative method. Furthermore, the system may be further configured to determine whether airflows in the at least one equipment rack satisfy a mass balance equation.

According to another embodiment, a non-transitory computer readable medium is provided. The computer readable medium stores sequences of instruction for modeling cooling performance including instructions that will cause at least one processor to receive input data from a storage device, the input data including data related to physical structures within at least one equipment rack, select, based on the data related to physical structures, at least one first equation of a plurality of predetermined equations that describe pressure values in a plurality of spaces within the at least one equipment rack, determine pressure values in identified spaces of the plurality of spaces by solving the at least one first equation using the input data, determine airflow values between identified spaces by calculating a difference between the pressure values and store, on the storage device, the airflow values as equipment rack airflow values within the at least one equipment rack. The sequences of instruction may include instructions that will cause the at least one processor to determine the pressure values by determining pressure values in identified spaces adjacent to at least one server positioned within the at least one equipment rack. In addition, the sequences of instruction may include instructions that will cause the at least one processor to determine a predicted airflow value for at least one fan of the at least one server based on the difference between the pressure values.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

Figure 4C:
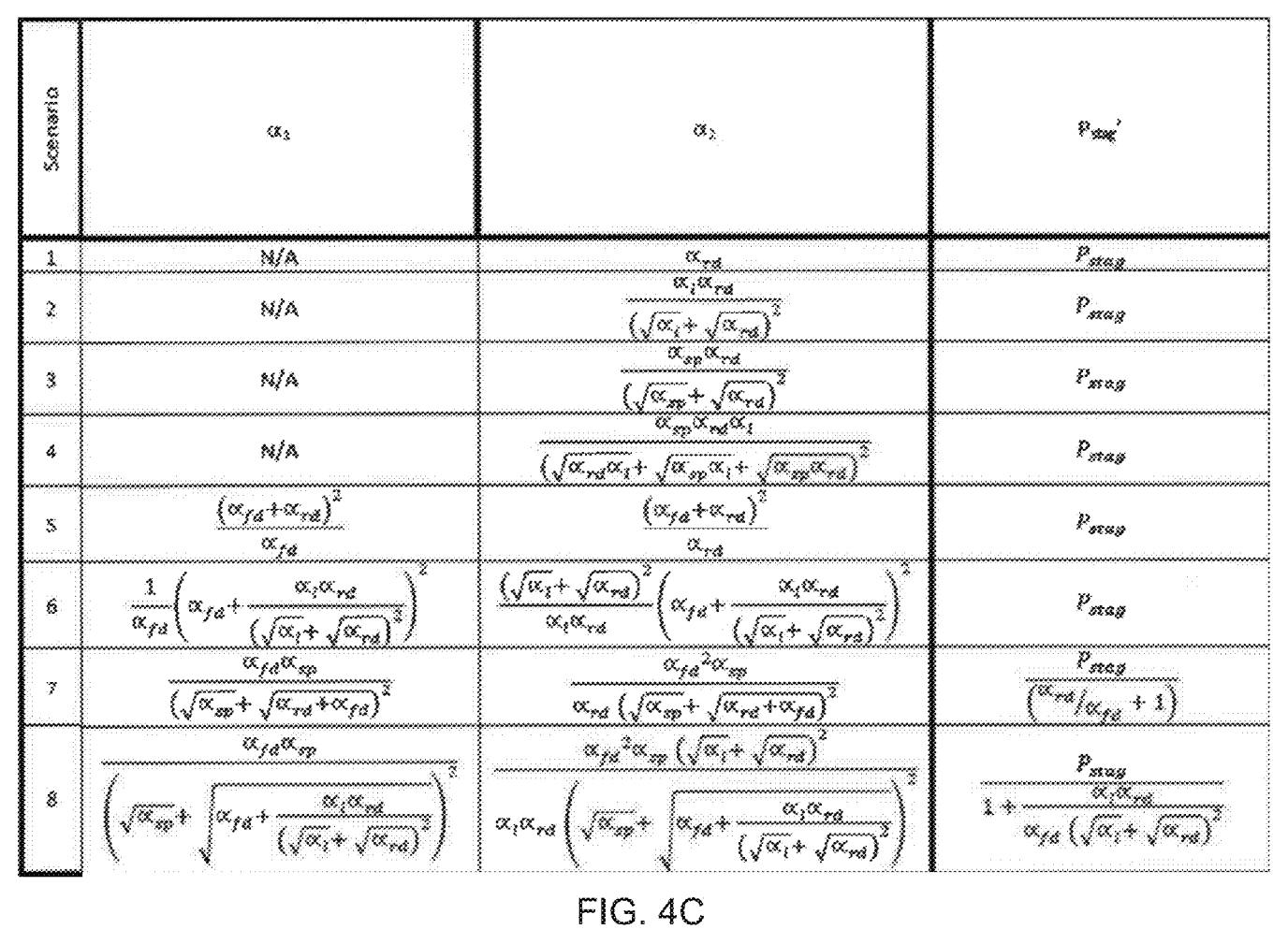

FIGS. 4A-4E show pressure node calculations to determine pressure at locations within racks having particular physical configurations;

FIGS. 5A and 5B show pressure node calculations to determine pressure at locations within racks having additional particular physical configurations;

DETAILED DESCRIPTION

Figure 1:
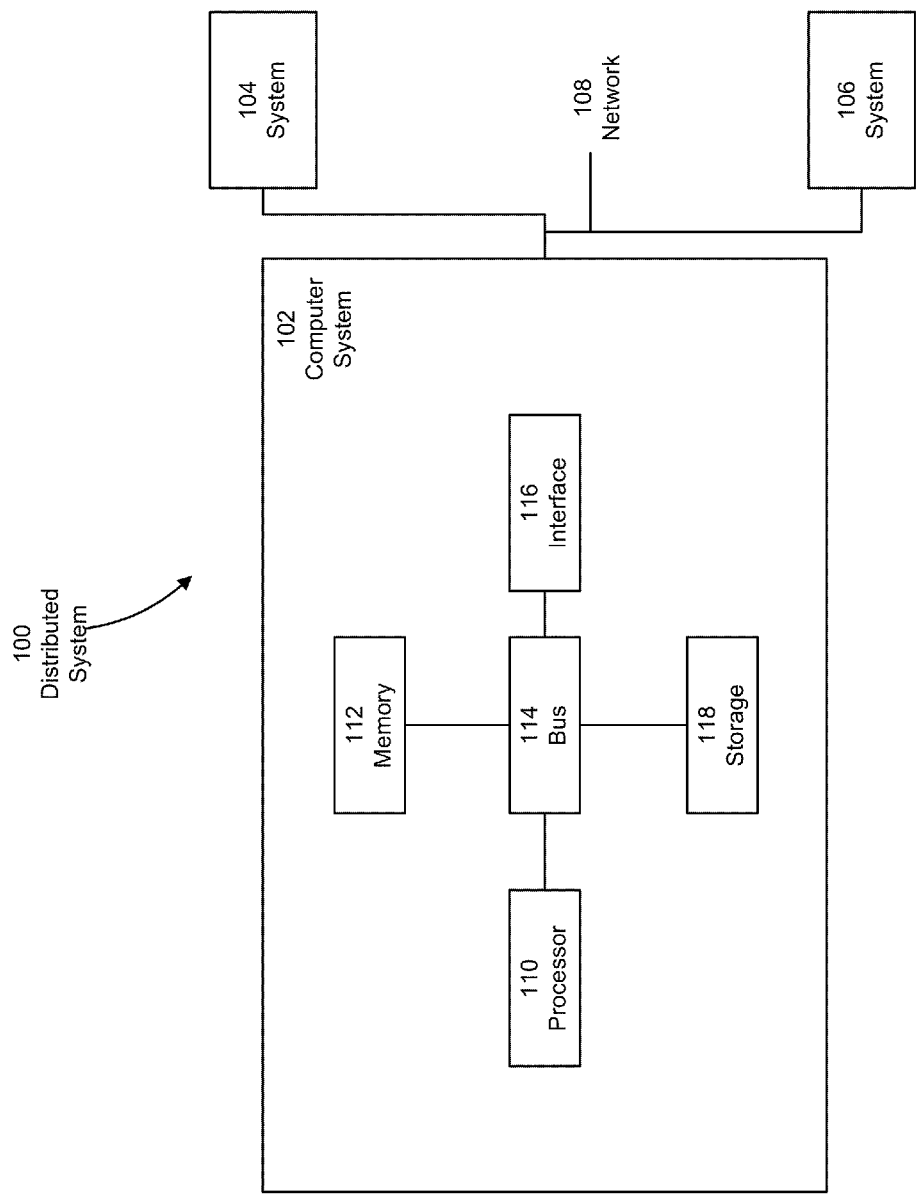
FIG. 1 shows an example computer system with which various aspects in accord with the present invention may be implemented.

At least some embodiments in accordance with the present invention relate to systems and processes through which a user may design new data center configurations and analyze, modify, manage and control existing configurations. These systems may facilitate this activity by allowing the user to create models of data center configurations from which performance metrics may be determined. Both the systems and the user may employ these performance metrics to determine alternative data center configurations that meet various design objectives. Further, in at least one embodiment, a system provides modeling and prediction of rack airflow for a proposed layout of a data center equipment within the rack and also provides prediction of cooling performance for an installed data center.

As described in U.S. patent application Ser. No. 12/019,109 (now U.S. Pat. No. 7,991,592), titled "System and Method for Evaluating Equipment Rack Cooling" filed Jan. 24, 2008 (referred to herein as "the '109 Application"), in U.S. patent application Ser. No. 11/342,300 (now U.S. Pat. No. 7,881,910), titled "Methods and Systems for Managing Facility Power and Cooling" filed Jan. 27, 2006, and in U.S. patent application Ser. No. 12/884,832, titled "System and Method for Predicting Perforated Tile Airflow in a Data Center" filed Sep. 17, 2010, each of which is assigned to the assignee of the present application, and each of which is hereby incorporated herein by reference in its entirety, typical equipment racks in modern data centers draw cooling air in the front of the rack and exhaust air out the rear of the rack. The equipment racks, and in-row coolers are typically arranged in rows in an alternating front/back arrangement creating alternating hot and cool aisles in a data center with the front of each row of racks facing the cool aisle and the rear of each row of racks facing the hot aisle. Adjacent rows of equipment racks separated by a cool aisle may be referred to as a cool aisle cluster, and adjacent rows of equipment racks separated by a hot aisle may be referred to as a hot aisle cluster. As readily apparent to one of ordinary skill in the art, a row of equipment racks may be part of one hot aisle cluster and one cool aisle cluster. In descriptions and claims herein, equipment in racks, or the racks themselves, may be referred to as cooling consumers, and in-row cooling units and/or computer room air conditioners (CRACs) may be referred to as cooling providers. In the referenced applications, tools are provided for analyzing the cooling performance of a cluster of racks in a data center. In these tools, multiple analyses may be performed on different layouts to attempt to optimize the cooling performance of the data center.

Some conventional data center design tools fail to model the cooling performance inside racks. In some circumstances, this may be an acceptable solution because when equipment is installed in racks following ideal practices (e.g., use of a standard racks with large-open-area doors, filling racks from bottom to top, using blanking panels and sealing other rack leakage paths), equipment airflow, inlet temperatures, and fan power consumption will be close to the nominal uninstalled conditions. Thus, under these conditions, the cooling design and planning generally does not need to "extend inside the rack".

However, these ideal practices are often impractical or at odds with other design choices due to the multitude of different rack types that may be present in a given facility, the difficulty of sealing around cable penetrations, and the desire to use rear-door cooling coils to provide all or part of the rack's cooling needs. Consequently, in many real situations, there may be substantial reductions in server airflow due to increased flow resistance and increases in inlet temperatures due to the recirculation of hot air inside the rack from internal equipment exhaust. Additionally, because the airflow-pressure operating point has been shifted, any equipment fan will consume more or less power relative to its uninstalled nominal performance. Finally, the rack configuration affects the relative fractions of airflow which exists through the intended rear opening of the rack and other leakage paths. Airflow which escapes through unintended leakage paths (e.g. the bottom and top of the rack) may be more easily recirculated to the front of the rack and should be accounted for in room-level cooling analyses. Even when a standard rack is used with a full complement of blanking panels, a meaningful fraction of airflow (e.g. around 10%) may exit through unintended leakage paths.

It is known to use commercially available Computational Fluid Dynamics (CFD) based software programs, such as "FLOVENT" available from Mentor Graphics Corporation, to conduct analyses of the airflows within racks. However, these programs are typically extremely expensive, slow to run, and require special expertise to operate. In response to these and other shortcomings, at least some embodiments described herein are directed to tools and methods by which rack airflow performance may be estimated in real time or near real time using common computers. The tools and methods may be used in conjunction with both data center design tools and with data center management tools, and do not require high-level operators.

The aspects disclosed herein in accordance with the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, modeling and presenting information regarding specific data center configurations. Further, computer systems in embodiments of the data center may be used to automatically measure environmental parameters in a data center, and control equipment, such as chillers or coolers to optimize performance. Moreover, the systems described herein may be configured to include or exclude any of the functions discussed herein. Thus the invention is not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present invention may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accordance with the present invention may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accordance with the present invention may be implemented within methods, acts, systems, system elements and components using a variety of hardware and software configurations, and the invention is not limited to any particular distributed architecture, network, or communication protocol.

FIG. 1 shows a block diagram of a distributed computer system 100, in which various aspects and functions in accord with the present invention may be practiced. Distributed computer system 100 may include one more computer systems. For example, as illustrated, distributed computer system 100 includes computer systems 102, 104 and 106. As shown, computer systems 102, 104 and 106 are interconnected by, and may exchange data through, communication network 108. Network 108 may include any communication network through which computer systems may exchange data. To exchange data using network 108, computer systems 102, 104 and 106 and network 108 may use various methods, protocols and standards, including, among others, token ring, ethernet, wireless ethernet, Bluetooth, TCP/IP, UDP, Http, FTP, SNMP, SMS, MMS, SS7, Json, Soap, and Corba. To ensure data transfer is secure, computer systems 102, 104 and 106 may transmit data via network 108 using a variety of security measures including TSL, SSL or VPN among other security techniques. While distributed computer system 100 illustrates three networked computer systems, distributed computer system 100 may include any number of computer systems and computing devices, networked using any medium and communication protocol.

Various aspects and functions in accordance with the present invention may be implemented as specialized hardware or software executing in one or more computer systems including computer system 102 shown in FIG. 1. As depicted, computer system 102 includes processor 110, memory 112, bus 114, interface 116 and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any storage device for storing data, such as a disk drive or other non-volatile storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI and InfiniBand. Thus, bus 114 enables communications, for example, data and instructions, to be exchanged between system components of computer system 102.

Computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable nonvolatile storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then copies the data to the medium associated with storage system 118 after processing is completed. A variety of components may manage data movement between the medium and integrated circuit memory element and the invention is not limited thereto. Further, the invention is not limited to a particular memory system or storage system.

Although computer system 102 is shown by way of example as one type of computer system upon which various aspects and functions in accordance with the present invention may be practiced, aspects of the invention are not limited to being implemented on the computer system as shown in FIG. 1. Various aspects and functions in accord with the present invention may be practiced on one or more computers having different architectures or components than that shown in FIG. 1. For instance, computer system 102 may include specially-programmed, special-purpose hardware, such as for example, an application-specific integrated circuit (ASIC) tailored to perform a particular operation disclosed herein, while another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C-, bytecode or interpreted code which communicates over a communication network, for example, the Internet, using a communication protocol, for example, TCP/IP. Similarly, aspects in accord with the present invention may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the present invention may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used. Further, in at least one embodiment, some aspects may be implemented using VBA Excel.

A computer system included within an embodiment may perform additional functions. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of Uppsala, Sweden or integration software such as Web Sphere middleware from IBM of Armonk, N.Y. However, a computer system running, for example, SQL Server may be able to support both aspects in accord with the present invention and databases for sundry applications not within the scope of the invention.

Example System Architecture

Figure 2:
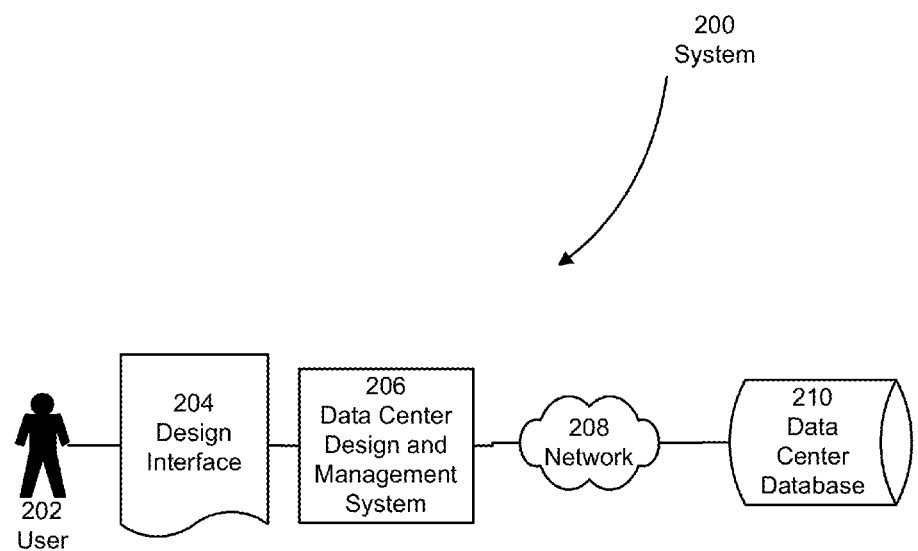
FIG. 2 illustrates an example distributed system including an embodiment.

FIG. 2 presents a context diagram including physical and logical elements of distributed system 200. As shown, distributed system 200 is specially configured in accordance with the present invention. The system structure and content recited with regard to FIG. 2 is for exemplary purposes only and is not intended to limit the invention to the specific structure shown in FIG. 2. As will be apparent to one of ordinary skill in the art, many variant system structures can be architected without deviating from the scope of the present invention. The particular arrangement presented in FIG. 2 was chosen to promote clarity.

Information may flow between the elements, components and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the invention.

Referring to FIG. 2, system 200 includes user 202, interface 204, data center design and management system 206, communications network 208 and data center database 210. System 200 may allow user 202, such as a data center architect or other data center personnel, to interact with interface 204 to create or modify a model of one or more data center configurations. According to one embodiment, interface 204 may include aspects of the floor editor and the rack editor as disclosed in Patent Cooperation Treaty Application No. PCT/US08/63675, entitled METHODS AND SYSTEMS FOR MANAGING FACILITY POWER AND COOLING, filed on May 15, 2008, which is incorporated herein by reference in its entirety and is hereinafter referred to as PCT/US08/63675. In other embodiments, interface 204 may be implemented with specialized facilities that enable user 202 to design, in a drag and drop fashion, a model that includes a representation of the physical layout of a data center or any subset thereof. This layout may include representations of data center structural components, including raised floor plenum characteristics, as well as data center equipment. The features of interface 204, as may be found in various embodiments in accordance with the present invention, are discussed further below. In at least one embodiment, information regarding a data center is entered into system 200 through the interface, and assessments and recommendations for the data center are provided to the user. Further, in at least one embodiment, optimization processes may be performed to optimize cooling performance and energy usage of the data center.

As shown in FIG. 2, data center design and management system 206 presents data design interface 204 to user 202. According to one embodiment, data center design and management system 206 may include the data center design and management system as disclosed in PCT/US08/63675. In this embodiment, design interface 204 may incorporate functionality of the input module, the display module and the builder module included in PCT/US08/63675 and may use the database module to store and retrieve data.

As illustrated, data center design and management system 206 may exchange (i.e. provide or receive) information with data center database 210 via network 208. This information may include any information required to support the features and functions of data center design and management system 206. For example, in one embodiment, data center database 210 may include at least some portion of the data stored in the data center equipment database described in PCT/US08/63675. In another embodiment, this information may include any information required to support interface 204, such as, among other data, the physical layout of one or more data center model configurations, the production and distribution characteristics of the cooling providers included in the model configurations, the consumption characteristics of the cooling consumers in the model configurations, and a listing of equipment racks and cooling providers to be included in a cluster.

In one embodiment, data center database 210 may store types of cooling providers, the amount of cool air provided by each type of cooling provider, and a temperature of cool air provided by the cooling provider. Thus, for example, data center database 210 includes records of a particular type of CRAC unit that is rated to deliver airflow at the rate of 5,600 cfm at a temperature of 68 degrees Fahrenheit. In addition, the data center database 210 may store one or more cooling metrics, such as inlet and outlet temperatures of the CRACs and inlet and outlet temperatures of one or more equipment racks. The temperatures may be periodically measured and input into the system, or in other embodiments, the temperatures and airflows may be continuously monitored using devices coupled to the system 200. Further in some embodiments, for installed data centers, actual airflow measurements from one or more perforated tiles may be used by a system to improve accuracy of one of the processes described herein. Still further, the measured airflow may be used by a system in one embodiment as a check against calculated airflows, and when a difference between measured and calculated exceeds a preset threshold, a warning may be initiated to alert an operator of the system.

Data center database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include data center design and management system 206, network 208 and data center equipment database 210, each may include one or more computer systems. Further, the system in FIG. 2 may also connect to one or more devices in a data center, including components of the cooling system or power distribution system to control and monitor these systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. For instance, in one embodiment, the data center design and management system 206 and the data center database 210 reside on the same computer system. Thus, embodiments of the invention are not limited to a specific number of users or systems.

In at least one embodiment, which will now be described, a tool is provided that predicts in real-time the airflow through inlets and outlets of equipment racks in a data center. The tool utilizes novel methods of modeling the physical structure of equipment racks and simplifying analysis of the models to predict real-time airflow performance. The ability to predict performance in real-time or near real-time allows the tool to be used to quickly analyze several possible solutions and consider various design trade-offs. As discussed further below, the tool can be used as a stand-alone trade-off tool, incorporated in a data center design system, or incorporated as part of a data center management system such as APC's InfrastruXure® Central and Operations Manager products discussed above.

In the following description, two novel, high-level methods are provided for estimating airflow into and out of equipment racks and the equipment housed with the equipment racks. In addition, novel techniques for modeling the physical structure of racks and simplifying calculations within the high-level methods are also provided. The two high-level methods are identified as the Flow Network Method (FNM) and the Potential Flow Method (PFM). Both of these methods may be incorporated in a tool which can be combined with existing data center design and management systems to provide improved performance.

Flow Network Model

The Flow Network Model (FNM) method is a fluid-flow prediction technique most often used to predict the pressure drop in duct and piping systems. The FNM is based on an assumption that the pressure drop experienced by a fluid moving through some resistive element (e.g. a length of pipe) is related to the flow rate through the resistive element by some simple function such as the function represented by Equation (1).

$$\Delta P = RQ^z \quad (1)$$

where R is typically a known resistance in units of pressure drop per flow rate squared. In the FNM used in at least some embodiments described herein, airflow is driven purely by pressure differences ignoring momentum. In other embodiments, the FNM may be "tuned" empirically against a large number of CFD benchmark solutions to indirectly account for the effects of momentum.

Figure 3:
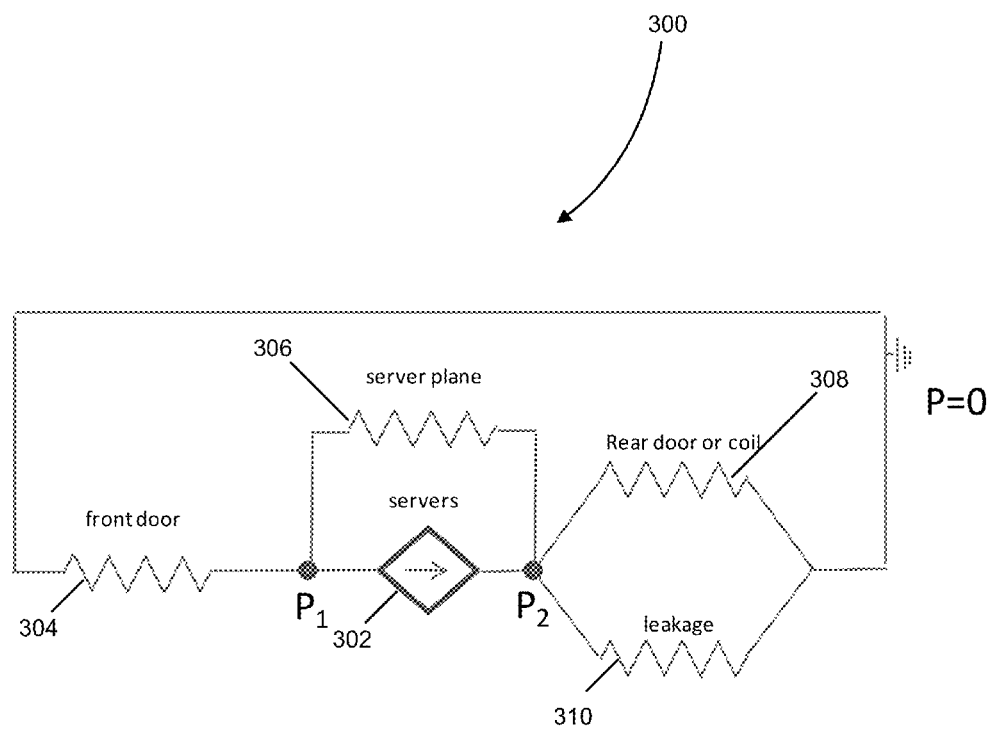
FIG. 3 depicts an electrical circuit analog of airflow in an equipment rack.

In the rack application of FNM, pressure drops through resistances (e.g., rack doors, leakage paths, and cooling coils) are assumed to follow a known pressure-airflow relationship of the form $\Delta P = \alpha Q^\beta$ where $\alpha$ and $\beta$ are constants. FIG. 3 shows an electrical circuit analog 300 of airflow in an equipment rack. In the analog, the current source 302 represents an equipment fan (such as a server fan), the resistor 304 represents the resistance to airflow of the front door of the equipment rack, the resistor 306 represents the resistance to airflow of the server plane, the resistor 308 represents the resistance to airflow of the rear door (or cooling coil) and the resistor 310 represents the resistance to airflow due to leakage. The illustrated example also includes two unknown pressure nodes: $P_1$ and $P_2$. In this example, all of the equipment in the rack is represented as a single aggregate entity which has a linear overall performance curve as shown in Equation (2).

$$Q_s = Q_s^{max}\left(1 - \frac{\Delta P}{P_{stag}}\right) \quad (2)$$

where $Q_s^{max}$ is the maximum server airflow realized when the server is operated in a resistance-free environment. $P_{stag}$ is the stagnation pressure of the server fans. This is the maximum external pressure difference the server may be exposed to and just barely generate airflow.

Airflow enters the rack through the front door, mixes with exhaust air which may pass through the server mounting plane and travels through the server. Server exhaust may then be recirculated through the server plane or leave the rack directly through leakage paths (typically openings in the rack roof and underneath the rack) or pass through the designed outlets (the rear door or cooling coil). Summing the airflow in and out of the $P_1$ and $P_2$ nodes yields two equations for the two unknown pressures, Equation (3) and Equation (4):

$$Q_S^{max}\left(1 - \frac{P_2 - P_1}{P_{stag}}\right) = \left(\frac{P_2 - P_1}{\alpha_{sp}}\right)^{1/\beta_{sp}} + \left(\frac{-P_1}{\alpha_{fd}}\right)^{1/\beta_{fd}} \qquad (3)$$

$$Q_S^{max}\left(1 - \frac{P_2 - P_1}{P_{stag}}\right) = \left(\frac{P_2 - P_1}{\alpha_{sp}}\right)^{1/\beta_N} - \left(\frac{P_2}{\alpha_r}\right)^{1/\beta_1} - \left(\frac{P_2}{\alpha_l}\right)^{1/\beta_1} \qquad (4)$$

where the subscript "fd" denotes the front door, the subscript "sp" denotes the server plane, the subscript "l" denotes leakage and the generic subscript "r" denotes either a rear door or a coil. Equations 3 and 4 may be solved numerically for $P_1$ and $P_2$, at least in theory, for any values of β. In practice, there may be multiple values (roots) of the equations such that it is difficult to create a single solver which works reliably over a range of values. However, β=2 is valid for most rack resistances under typical conditions and, in this case, it is possible to obtain exacts solutions for $P_1$ and $P_2$. This has been done for 24 practical scenarios covering various rack configurations. The final expressions for $P_1$ and $P_2$ in these 24 scenarios are given in FIGS. 4A-4E, 5A, and 5B. Note that the solutions are fairly complex and that, although multiple roots are possible from a pure mathematical standpoint, only the "correct" roots, i.e., those that give physically sensible predictions consistent with the model, are shown.

FIGS. 4A-4E include scenarios 1-19 and FIGS. 5A and 5B include scenarios 20-24. As shown, each of these scenarios specifies a particular combination of physical structures associated with the rack to be modeled. In the example shown, the presence or absence of these physical structures is denoted by "Y" or "N," respectively. The specific physical structures described by the equations in the illustrated example include a front door, a server plane, leakage, a rear door and a rear coil. In a particular example, the scenario 1 specifies that the modeled rack has a rear door but no front door, server plane, leakage or rear coil. Other embodiments may include other physical structures and embodiments are not limited to a particular structure or set of structures.

Once $P_1$ and $P_2$ are known, airflow rates may be computed from the known pressure airflow characteristics of the resistances, $\Delta P = \alpha Q^\beta$. Server inlet temperature and fan power may also be computed using $P_1$ and $P_2$. This method of computation is discussed further below.

Figure 6:
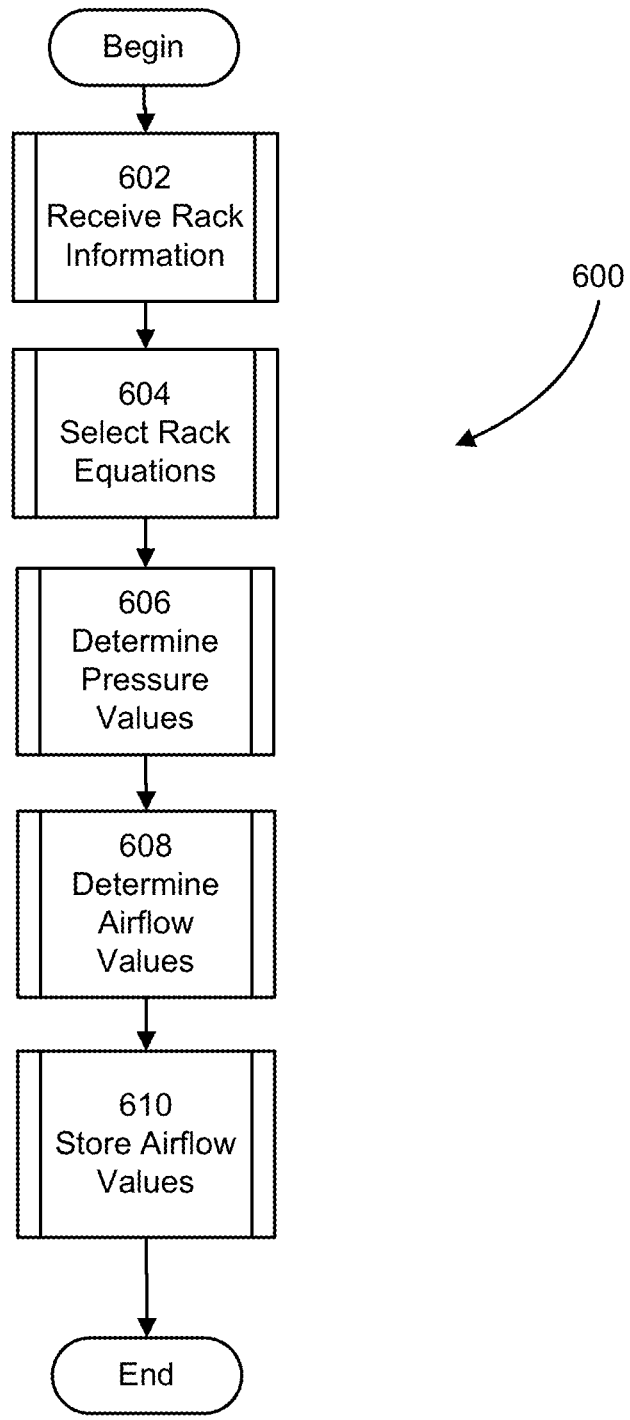
FIG. 6 shows a process for determining airflows in a rack in accordance with one embodiment.
Figure 7:
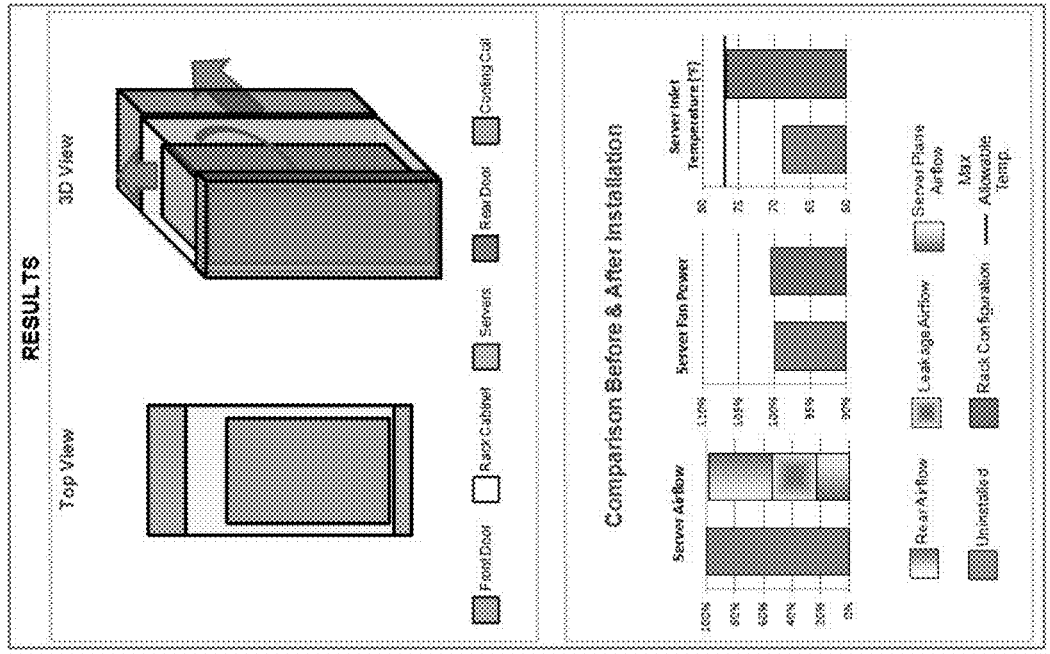
FIG. 7 shows a user interface provided by a rack cooling performance model.

FIG. 6 provides a summary of a process 600 used in a data center management and/or design system for computing rack airflow using an FNM based process in accordance with one embodiment. In a first act 602 of the process, information related to the rack and its physical configuration is received by the system. In one embodiment, the information is entered by a user, while in at least one other embodiment, the information is accessed from information regarding the data center stored in the system. In one embodiment, the system displays a user interface, such as the user interface depicted in FIG. 7, through which the system receives input data and provides results of the modeling process.

In a second act 604, the system selects one or more equations to model the rack airflow based on input information that specifies the physical structures included in the rack. In one embodiment, the system selects the equation or equations used to model the rack by matching the input physical configuration of the rack to a stored configuration that is associated with the equation or equations. In this embodiment, to perform this matching function, the system accesses information such as the information illustrated in FIGS. 4A-4E, 5A and 5B.

Next, in act 606, the system determines pressure values of spaces within the rack by solving the modeling equations. In act 608, the system determines airflow between the spaces using the difference in the pressure values. Lastly, in act 610, the system stores the determined airflow as an airflow value for the rack. In at least one embodiment, the results of the process 600 are used by the data center management and/or design system as one of the inputs to analyze the cooling performance of a data center.

Potential Flow Method (PFM)

The Potential Flow-Method is a physics-based technique used in one embodiment to compute the rack airflow pattern from first principles without a need for empirical "tuning" of the model against benchmark CFD cases. The potential flow method naturally handles the physical configuration of racks without additional steps or approximations. The potential flow method is particularly well suited to rack applications because the airflow patterns within racks are relative simple. This is so because the effects of buoyancy within a rack are limited due to the relatively-small length scales and because warm air and cool air streams are largely separated from one another.

Using this method, computations are intensive and may be slower than other methods described herein (perhaps a few seconds to a minute with typical computing hardware and typical layouts). In addition, there is no guarantee of how quickly or even if a "converged" solution will be found. In at least one embodiment, rack airflow calculations are two dimensional; however, in other embodiments, three dimensional simulations are used. 3-D analyses provide a slight improvement in accuracy at the cost of solution speed.

For airflow which can be modeled as incompressible and irrotational, the airflow pattern may be determined from Poisson's Equation as shown in Equation (5).

$$\nabla^2 \phi = S''' \qquad (5)$$

Where $S'''$ is a volumetric-flow-rate source per unit volume and $\phi$ is the velocity potential, related to the x and y-velocity components is as shown in Equation (6).

$$u = \frac{\partial \varphi}{\partial x} \qquad (6)$$
$$v = \frac{\partial \varphi}{\partial y}.$$

In the absence of a source term, Equation 5 reduces to Laplace's Equation, $\nabla^2 \phi = 0$. The "incompressible" assumption is rigorously applicable to rack airflow; however, the "irrotational" assumption is strictly an approximation. From a calculation standpoint, in one embodiment, this assumption reduces the governing equations from 3 (1 mass conservation and 2 momentum conservation) equations and 3 unknowns (u, v, and P) to 1 equation for 1 unknown. As walls and jet flows provide a mechanism by which the real airflow pattern can become rotational, Equation 5 is not strictly applicable in these areas; however, the effect of friction along the walls is of minor significance in determining rack airflow; the potential flow method correctly predicts that flow cannot penetrate a wall but in at least some embodiments does not model the frictional effects along the wall.

Figure 8:
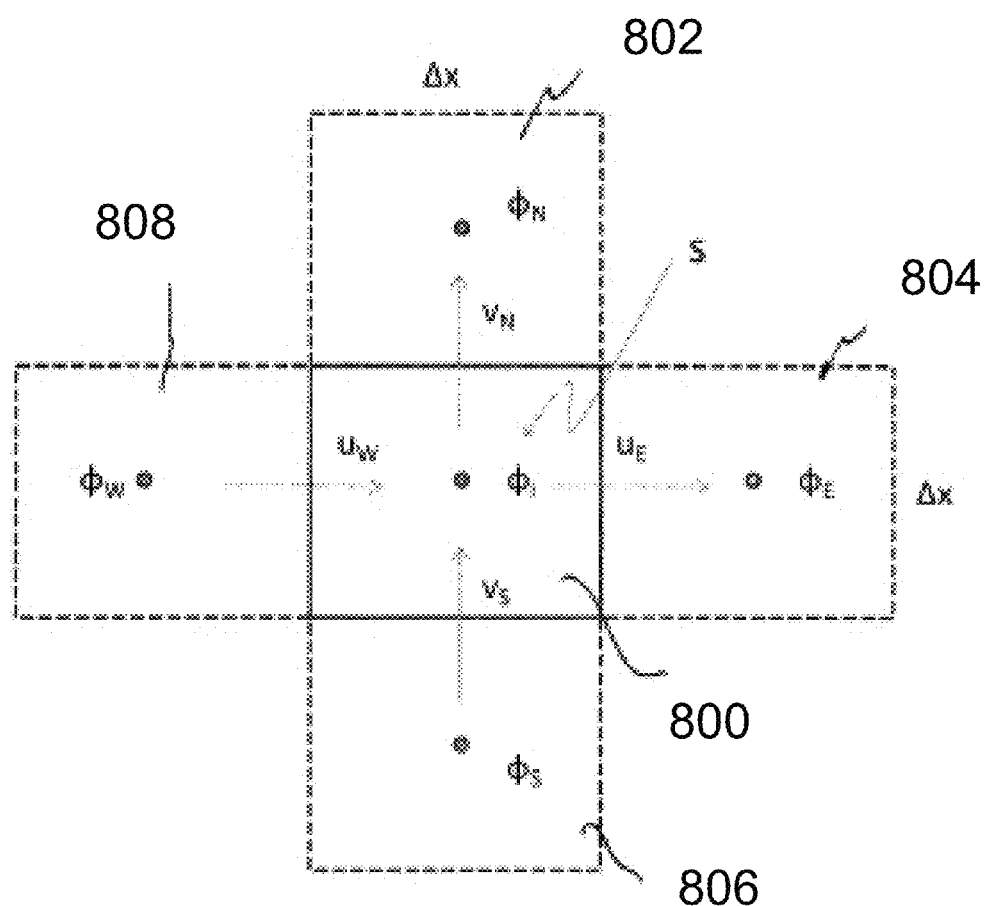
FIG. 8 demonstrates the use of grid cells in accordance with one embodiment.

Equation (5) appears simple; however, the complex boundary conditions for a real rack application make analytical solutions of Equation (5) either impossible or very difficult and not very general. In one embodiment, which will now be described, a numerical solution of the problem uses a Finite Difference method. Following this method, the physical problem space to be analyzed is divided into a number of grid cells of size $\Delta x$ by $\Delta x$ by d. One finite difference equation is then constructed for each grid cell creating a set of n equations or n unknowns where n is the number of grid cells. FIG. 8 shows a 2-D grid cell 800 with neighboring grid cells 802, 804, 806 and 808. Airflow may enter or exit each side of the grid cell; additional airflow may be added to or subtracted from the grid cell by the source term S'''. The net volumetric flow rate (e.g. in cfm) entering each grid cell must equal that exiting the grid cell as shown in Equations (7) and (8).

$$\Delta x d\left(\frac{\varphi_i - \varphi_W}{\Delta x}\right) + \Delta x d\left(\frac{\varphi_i - \varphi_S}{\Delta x}\right) + S = \Delta x d\left(\frac{\varphi_E - \varphi_i}{\Delta x}\right) + \Delta x d\left(\frac{\varphi_N - \varphi_i}{\Delta x}\right) \quad (7)$$

or, $$\varphi_i = \frac{1}{4}\left(\varphi_N + \varphi_S + \varphi_E + \varphi_W - \frac{S}{d}\right)\varphi_i = \frac{1}{4}\left(\varphi_N + \varphi_S + \varphi_E + \varphi_W - \frac{S'''}{d}\right) \quad (8)$$

The form of Equation 8 changes somewhat for grid cells located against a solid wall or in a corner; adjacent solid cells do not contribute velocity potentials to the equation and, in a 3-D analysis, airflows in the vertical direction may be explicitly included. The set of n equations and n unknowns is typically solved iteratively using a standard technique such as the Gauss-Siedel method as described in *Advanced Engineering Mathematics*, by E. Kreyszig Seventh Edition. 1993. John Wiley & Sons, New York. p. 986. In this method, the unknown associated with each grid cell is written explicitly on the left-hand side of the equation as in Equation 8. An initial guess is made for all $\phi_i$'s and then the guesses are improved by considering each equation in turn, marching through all grid cells. For each equation, the most-recently computed values of all $\phi_i$'s are always used. The solver keeps sweeping through all equations until the $\phi_i$'s no longer change or a fixed iteration limit has been reached.

Once the velocity potential field is determined, velocities are computed using Equation 6 re-written as a finite-difference approximation as Equation (9):

$$u_{(i+\frac{1}{2},j)} = \frac{\varphi_{(i-1,j)} - \varphi_{(i,j)}}{\Delta x}$$
$$v_{(i,j+\frac{1}{2})} = \frac{\varphi_{(i,j+1)} - \varphi_{(i,j)}}{\Delta x} \quad (9)$$

where i and j denote grid location in the x and y-directions respectively and the "½" signifies the cell face $\Delta x/2$ away from the cell center in the positive direction.

The rack pressure distribution is determined in the pressure flow method of one embodiment using a "pressure correction" technique where the corrector pressure P' is varied until a mass balance between rack inlet airflow and rack outlet airflow and leakage airflow is achieved. The pressure at any point can be determined using the Bernoulli equation as shown in Equation (10):

$$P_i + \frac{1}{2}\rho V_i^2 = \text{constant} \quad (10)$$

where $V_1$ is the magnitude of the velocity (speed) of the airflow at point i. According to Equation 10, if the pressure at one point in the rack is known, then the pressure at all points can be determined. However, initially, the absolute pressure at any given point is not known, but as will now be described, the pressure at one point can be determined. The correct absolute (thermodynamic) pressure $P_i$ can be decomposed into two parts as shown in Equation (11).

$$P_i = P_i^* + P' \quad (11)$$

Where $P_i^*$ is the relative pressure computed from Equation (10) and P' is the constant pressure correction that must be added to all $P_i^*$s to obtain the desired absolute pressure. A reference point, e.g. the coordinate origin, is taken to have a pressure of some combination of $P_1$ or $P_2$, as determined by the FNM, and all other $P_i^*$s are computed relative to this value. Alternatively, two reference points, e.g. the spaces denoted by $P_1$ and $P_2$ are taken to have pressures of $P_1$ and $P_2$ and all other $P_i^*$s are computed relative to this value. The correct P' is the one that results in an overall mass balance between rack inlet airflow and rack outlet airflow and leakage airflow.

In one embodiment, $P_i$ is found numerically by adjusting P' until an overall mass balance between rack inlet airflow and rack outlet airflow and leakage airflow is satisfied. In other embodiments, various methods can be employed, and in one embodiment, a simple bisection method is used in which the overall mass balance is checked based on guesses for P'; subsequent guesses are made halfway between the two previous best guesses until P' changes by no more than a negligible amount. The search space for P' is based on physical scales of the problem, e.g., from $-3P_{max}$ to $3P_{max}$ where $P_{max} = \text{Max}(|P_1|, |P_2|)$.

In another embodiment, the "airflow correction" technique is used, as an alternative to the pressure-correction technique, to model the airflow-pressure coupling. In the "airflow-correction" technique, physically-correct pressures, i.e. those that satisfy the mass balance between rack inlet airflow and rack outlet airflow and leakage airflow, are not explicitly determined. Instead, initial pressures at every point are determined relative to some combination of $P_1$ and $P_2$. The pressures are then used to determine airflow rates within the rack. Instead of correcting the pressure values at this point, in the airflow-correction technique, predicted airflow rates within the rack are simply corrected up or down uniformly over all spaces as needed to satisfy the mass balance between rack inlet airflow and rack outlet airflow and leakage airflow. The airflow-correction technique adds additional approximations to the coupled potential-flow-Bernoulli-Equation model which may reduce accuracy; however, it significantly increases solution speed and stability.

Figure 9:
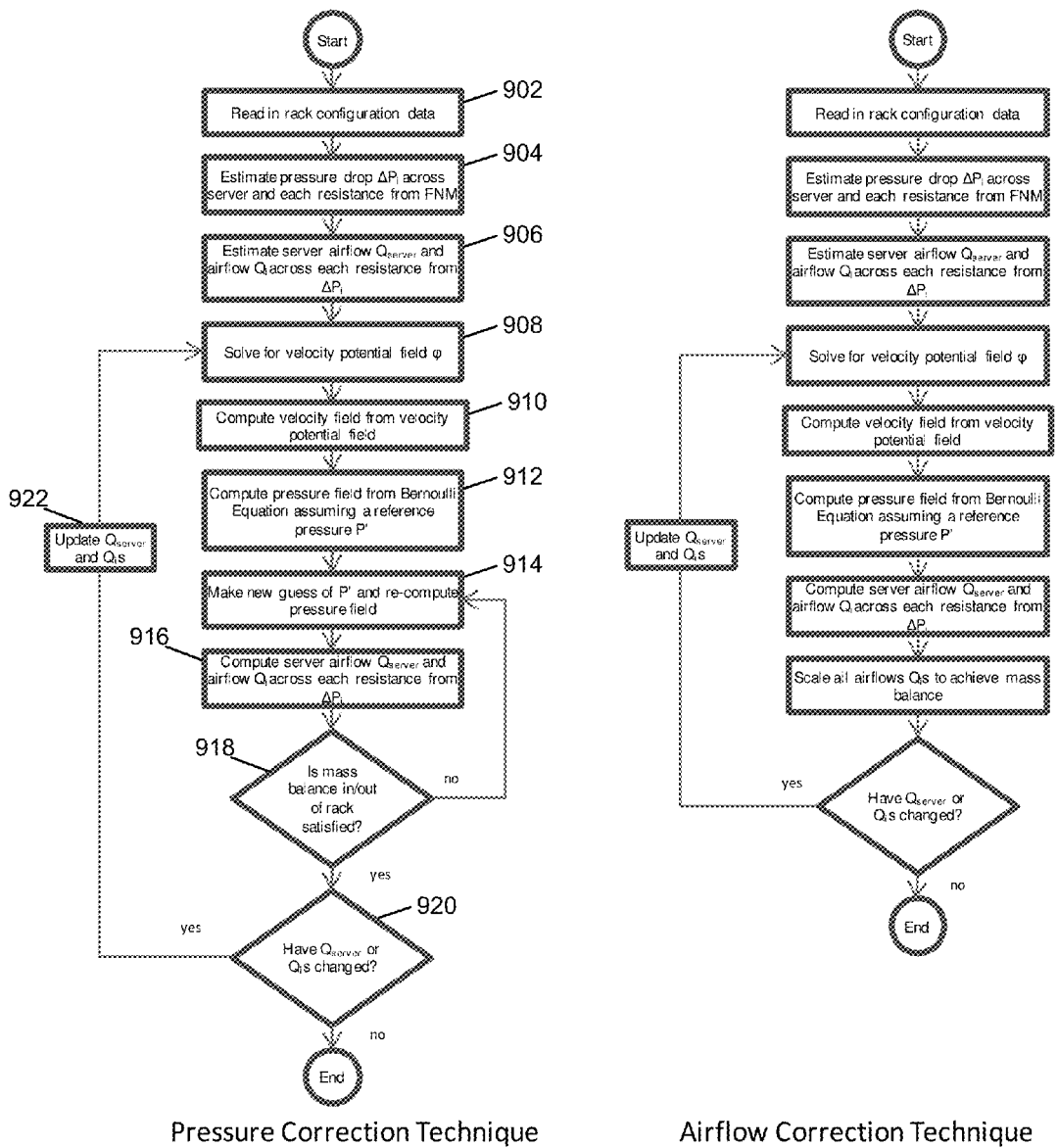
FIG. 9 depicts another process for determining airflows in a rack in accordance with one embodiment.

In at least one embodiment, the PFM continues iteratively with updated predictions of the potential, and thus velocity field. This process is used because, the PFM begins with approximations for the various rack airflow rates, and the approximations are changed when new rack airflow rates are computed based on the computed pressure field. The solution continues until airflow between spaces in the rack is consistent with the predicted pressure field. Each new solution to the velocity field represents one "outer" iteration. "Inner" iterations are one pass through all grid cells while solving for $\phi$. The entire solution process 900 is summarized in FIG. 9.

In a first act 902 of the process 900, information is read into a system configured to perform the process 900. The system may be one of the computer systems described above. The information may be read into the system from a storage media, transferred in to the system over a network, and/or entered into the system by a user. In a second act 904 of the process 900, the pressure drop across each resistance as determined using FNM or some other estimation method. Next, at act 906, the server airflow and the airflow across each resistance is determined using the previously determined change in pressure. Next, at act 908, velocity potentials are determined, and then at act 910, velocities are determined using Equation (9). At act 912, a first relative pressure $P_i^*$ is set equal to some combination of $P_1$ and $P_2$ and all other relative pressure values are then determined. At act 914, a first estimated value is set for the constant pressure correction value P' of zero, and each value of absolute pressure $P_1$ is also determined. At act 916, server airflow is determined using Equation 2 and the airflow across each resistance, i.e. between two identified spaces, in the rack is determined using the equation $\Delta P = \alpha Q^B$ and at decision block 918, a determination is made as to whether the mass balance between rack inlet airflow and rack outlet airflow and leakage airflow is satisfied within a predefined threshold. In one embodiment the mass balance between rack inlet airflow and rack outlet airflow and leakage airflow is within the threshold if the absolute difference between total rack inflow and total rack outflow is less than 0.5% of the maximum server airflow. If the outcome of block 918 is YES, then the airflow values determined at act 916 are the final airflow values and the process 900 ends. If the outcome of decision block 918 is NO, then the process returns to act 914 where a new value of P' is used. Once decision block 918 is satisfied, the process determines at decision block 920 whether the server airflow change is less than a threshold of 0.01% of the maximum server airflow. If the outcome of decision block 920 is NO, then the process ends, and the rack airflow values are those most recently determined at act 916. If the outcome of decision block 920 is YES, then the process proceeds to act 922 where the airflow across each resistance is updated. Once the airflows are updated at act 922, then acts 908 through 920 are repeated until the outcome of block 920 is NO, then the last airflow values are set as the final airflow values for the rack. If acceptable convergence is not achieved after a specified number of iterations a warning message may be presented to the user. This message may also include an indication of the quality of the convergence in terms of a residual error based on the degree to which the mass balance between rack inlet airflow and rack outlet airflow and leakage airflow is satisfied.

When using the PFM to solve for rack airflow, the most computationally costly process is solving for velocity potentials. For example, to solve for the velocity potentials for 3,200 grid cells, several hundred inner iterations may be required. Additionally, several hundred outer iterations, in which rack boundary conditions are updated, may be required. In total, several hundred-thousand or million calculations can be performed to solve for converged rack airflows. In some embodiments, to remove some of the computational overhead, a larger fixed grid is used, but at the cost of accuracy and flexibility in defining smaller geometric features. In one embodiment which will now be described, a variable grid is used and its use combines the accuracy of small grid cells with the speed of large grid cells to greatly improve the efficiency of the algorithm. In one embodiment using a variable grid, to ensure accuracy, grid cells associated with physical structures in the rack, such as the server plane or the rear door, are made smaller while larger grid cells are placed in remaining areas. In at least one embodiment, in a computer system implemented to perform a rack airflow analysis, once parameters specifying the physical structure of the rack are entered into the system, the system will automatically establish a variable grid using a smaller grid in areas that have inlets, outlets, and resistances. Accordingly, the analysis involved in analyzing the variable grid model is greatly simplified.

The finite difference equations for velocity potential and other variables are similar for fixed and variable grids. However, with a variable grid, there may be one-to-many in addition to one-to-one cell-face relationships. Further, with variable cell sizes in the same model, the node-to-node spacing ($\Delta x$ in FIG. 8) is also variable and Equation (8) is altered accordingly.

As previously described, solving for the velocity potentials is the most computationally costly portion of solving for the rack airflow. In at least one embodiment the speed and reliability of this part of the solution is improved by adding a relaxation factor, $\omega$, such that new values of velocity potential are computed using Equation (12).

$$\phi_i = (1-\omega)\phi_i^{old} + \omega\phi_i^{new} \qquad (12)$$

Where $\phi_i$ is the final, adjusted value to be used to begin the next iteration, $\phi_i^{old}$ is the value from the previous iteration and $\phi_i^{new}$ is the value just calculated before adjustment. Thus, $\omega=1$ is no relaxation, $\omega<1$ is under relaxation, and $\omega>1$ is over relaxation. The concept of a relaxation factor is common in CFD and other numerical analyses; in the present application, which features fairly stable solutions, over-relaxation can often be used to speed-up solutions by perhaps a factor of 10 and, in many cases, $\omega$ can be set as large as 1.8. However, in cases where high localized velocities can cause the solution to become unstable, under-relaxation is used to ensure reliable convergence. Although, the relaxation factor was just discussed in the context of inner iterations (the solution of velocity potentials), the same concept is applied in some embodiments to outer iterations wherein an equation analogous to Equation (12) is used to set the rack airflow rates.

As discussed above, the PFM solution process includes a series of inner and outer iterations. In typical examples, many inner iterations are performed for each outer iteration, and since inner iterations are the most computationally expensive portion of the solution in one embodiment, the number of inner iterations performed is minimized while ensuring that the final results are fully converged. In this embodiment, it is recognized that during the earlier outer iterations, excessive inner iterations are unnecessary and wasted as the rack airflow rates will be changed significantly at the next outer iteration anyway and will then no longer be compatible with the computed velocity potential field. After many outer iterations, rack airflow rates change much less from outer-iteration to outer-iteration and more inner iterations are justified and required to achieve accuracy. Through empirical testing, it is found that linearly increasing the number of inner iterations with every outer iteration provides consistently well-converged results while minimizing the total number of inner iterations. It is also observed that the improved number of starting inner iterations and the rate of increase depend primarily on the size of the rack and its physical configuration. Larger racks with more open configurations, i.e., with sparse server populations, generally require more inner iterations.

Embodiments described above provide models for estimating airflows in a rack which can be used in stand alone systems or included in a more comprehensive data center analysis and management system. The different models provide a range of solution accuracy and solution speed. For applications when instantaneous results are not mandatory, PFM provides the greatest value because it provides greater detail and superior accuracy when modeling alternative configurations such as missing blanking panels and sparse server populations. If solution speed must be essentially instantaneous, FNM would be the first choice.

Predicting Server Airflow and Fan Power

Figure 10:
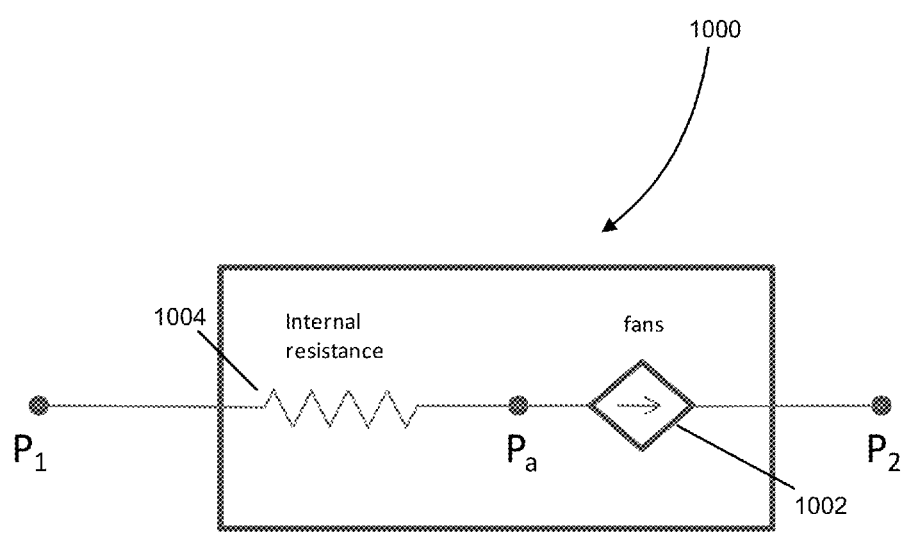
FIG. 10 shows an electrical circuit analog of airflow in a server.

Server airflow varies based on installation environment. For example, if 1-U servers (which have small, low-stagnation-pressure fans) fill a rack with a cooling coil and minimal leakage paths, the airflow rate may be reduced by approximately 20% relative to the same servers operating in an open-framed rack. The factors that affect an example server's response to external pressure are the server fan and internal-resistance characteristics as shown in FIG. 10. FIG. 10 shows an electrical circuit analog 1000 of airflow within an equipment rack. In the analog, the current source 1002 represents an equipment fan (such as a server fan), the resistor 1004 represents the resistance to airflow of the server. The illustrated example also includes three unknown pressure nodes: $P_1$, $P_2$ and $P_a$. An estimate of the resistor 1004 is needed to compute the relative fan power under different rack installation configurations. Further, an airflow-pressure curve for the server as a whole is needed to determine whether this relationship tracks that of the server fans in isolation.

Assuming that the server fan airflow is linear with pressure drop, the server fan airflow may be written as Equation (13):

$$Q_s = Q_{SF}^{max}\left(1 - \frac{P_2 - P_u}{P_{stag}}\right) \quad (13)$$

where $Q_{SF}^{max}$ is the maximum server fan airflow (which would be achieved with the fan removed from the server and operated in free space) and $P_{stag}$ is the stagnation pressure of the fan or the maximum pressure rise at which the fan can deliver any airflow.

Further assume that the server fans operate at a known fraction $\gamma$ of their maximum airflow which, for example, could be taken as 0.7 and that the internal server resistance (pressure drop) increases with the airflow rate squared. The internal server resistance may be estimated using Equation (14):

$$P_1 - P_a = \frac{(1-\gamma)}{\gamma^2} P_{stag}\left(\frac{Q_q}{Q_{SP}^{max}}\right)^2 \quad (14)$$

Solving Equation 14 for $P_a$, substituting this into Equation 13 and then solving for $Q_s$ as a function of $\Delta P = P_2 - P_1$ leads to Equation 15:

$$Q_s = \frac{\gamma}{(1-\gamma)} Q_S^{max}\left\{\sqrt{\frac{(1-\gamma)}{\gamma^2}\left(1 - \frac{\Delta P}{P_{stag}}\right) + \frac{1}{4}} - \frac{1}{2}\right\} \quad (15)$$

where $Q_s^{max} = \gamma Q_{SF}^{max}$ is the maximum overall server airflow. Equation 15 provides the desired equation for the server's response to an external pressure drop. Although, the server fan curve was assumed to be linear, the non-linear internal server resistance has made the overall server response also nonlinear. However, for practical scenarios, Equation 15 may be approximated as linear as Equation (16):

$$Q_S = Q_S^{max}\left(1 - \frac{\Delta P}{P_{stag}}\right) \quad (16)$$

Figure 11:
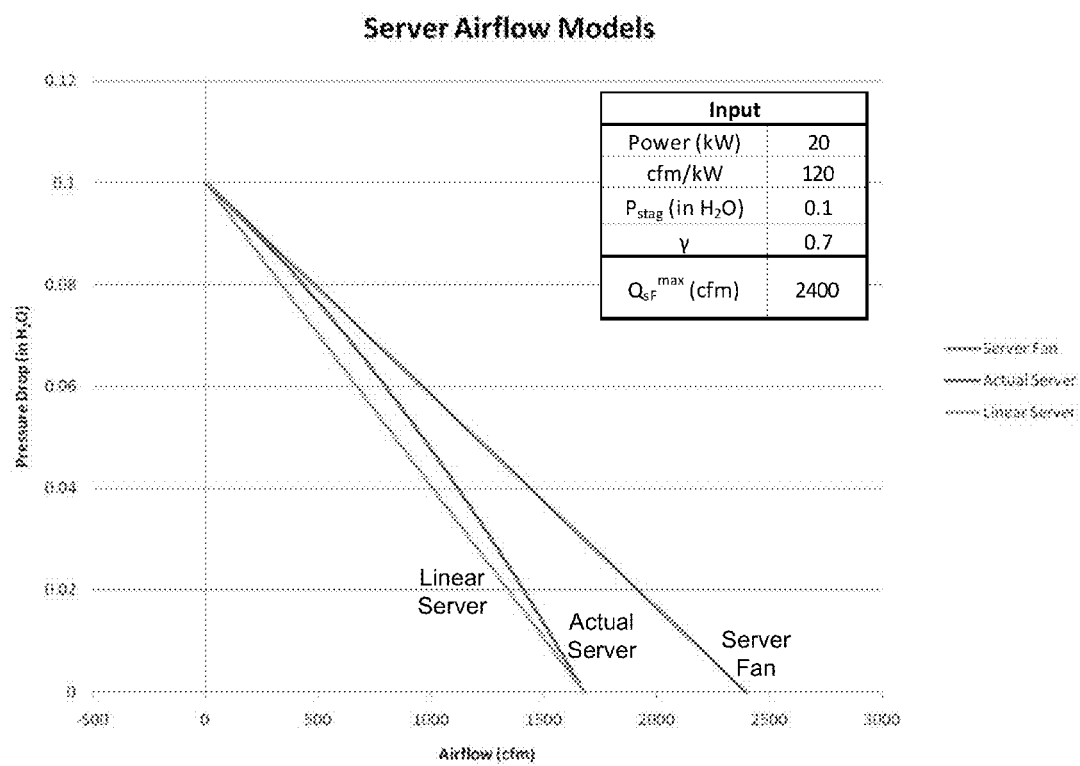
FIG. 11 illustrates performance data for a plurality of techniques for modeling server airflow.

FIG. 11 shows a comparison of the performance of models based on Equations 15 and 16 for the indicated design parameters. As shown, the actual server response to an external pressure drop is not too far from linear and that the approximation is better near maximum and minimum server airflow rates. Because the linear approximation is much simpler and sufficiently accurate relative to the assumptions in the model, it is used in some embodiments including FNM and PFM models.

The mechanical energy imparted on the airflow by the fan is equal to the product of the pressure drop and the airflow rate, Power=$\Delta PQ$. Breaking the total pressure into contributions which are internal and external to the server, the server power can be computed using Equation (17):

$$\begin{aligned} \text{Power} &= \Delta P Q_s \\ &= (\Delta P_{est} + \Delta P_{int}) Q_s \\ &= \left[P_2 - P_1 - (1-\gamma) P_{stag}\left(\frac{Q_s}{Q_s^{max}}\right)^2\right] Q_s \end{aligned} \quad (17)$$

Under some circumstances, this can be considered the "ideal" target power. The actual electrical power delivered to the fan also depends upon the fans electrical efficiency $\eta$. Assuming $\eta$ remains constant, Equation 17 can be used to compute the relative change in server fan power between alternative configurations without any knowledge of the specific value of $\eta$.

Temperature Prediction

In some embodiments, the rack inlet temperature is an assumed, predetermined value for purposes of the rack cooling design tool as all predicted airflows are internal to the rack. In other embodiments, the cooling air supply temperature, ambient temperature, and cold-aisle capture index (CI) are entered rather than rack inlet temperature directly. These embodiments emphasize the importance of the external rack environment to the user and let the user explore the effect of many realistic scenarios easily by adjusting CI. With this approach, the rack inlet temperature is predicted using Equation (18):

$$T_{rack} = CI \cdot T_{supply} + (1-CI) T_{amb} \quad (18)$$

where the rack inlet temperature is the well-mixed temperature of ambient and cooling supply streams. For the simple FNM described in detail above, the temperature at nodes $P_1$ or $P_2$ can be determined from an energy balance of flows in and out of each node, as represented in Equation (19) and Equation (20):

$$T_1 = T_{server} = T_{rack} + \Delta T_s\left(\frac{Q_{SP}}{Q_N}\right) \quad (19)$$

$$T_2 = T_{rack} + \Delta T_s\left(\frac{Q_s}{Q_N}\right) \quad (20)$$

where $Q_s$, $Q_{SP}$, and $Q_R$ are the server, server plane, and total rack airflow rates respectively.

Integrating Rack and Room Cooling Design Tools

Figure 12:
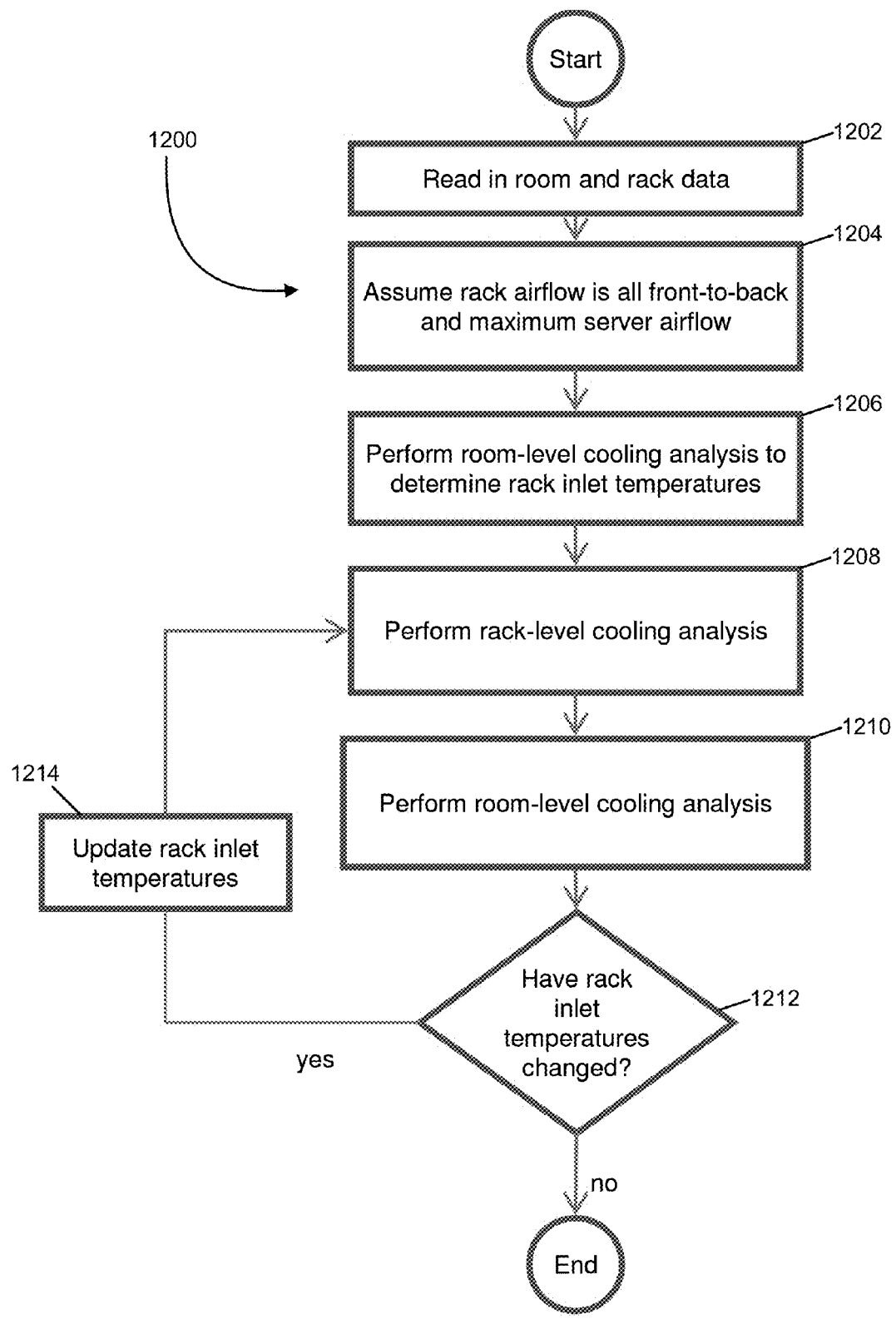
FIG. 12 depicts a process for modeling room and rack cooling performance.

Embodiments using either FNM and PFM to determine rack cooling performance may be coupled with any room-cooling design tool that explicitly calculates airflow patterns throughout the space, such as CFD, PFM, or FFD. FIG. 12 illustrates one example of such an integration process, process 1200. First, in act 1202, a computer system implementing the process 1200 reads rack and room configuration data. Next, in act 1204, the computer system sets the model parameters to values that indicate that all rack airflow is front to back and the airflow generated by equipment in the rack is at maximum. Then, in act 1206, the computer system performs a room-level cooling performance analysis to determine rack inlet temperatures. In act 1208, the computer system performs a rack-level cooling performance analysis to determine rack airflows. The output of this rack-level analysis is used to conduct another room-level analysis in act 1210. In act 1212, the computer system determines if the rack inlet temperatures changed from the previous room-level analysis by an amount greater than a pre-defined threshold. If the determination is NO, then the temperature values determined at act 1206 are the final temperature values and the computer system discontinues execution of the process 1200. If the outcome of decision block 1212 is YES, then the computer system updates the rack inlet temperatures and returns to act 1208 where the updated rack inlet temperature is used to conduct another rack-level cooling analysis.

FNM and PFM techniques can also be coupled with Capture-Index based cooling calculators (e.g. algebraic models which have been the subject of several earlier patent applications, such as the '109 application). This process is identical to that shown in FIG. 12; however, in this case, airflows and temperatures are not explicitly computed throughout the room. Instead, only airflow patterns and temperatures associated with each rack and cooler inlet and outlet are predicted. In this case, the algebraic calculators may be extended to consider the fraction of airflow leaving the top of the rack and/or from other leakage paths as well as the rear of the rack. First, rack airflows are determined using the present invention and then the resulting split of airflow out of the rack is used as input to the CI calculator. In this manner, the effect of internal rack airflow on the room environment can be included in the cooling analysis. If this process is repeated iteratively, the room effect, e.g. an increase in rack inlet temperature, can be included in subsequent rack-airflow calculations.

Empirical Tuning of Resistance Values and Validation against CFD

In some instances, both FNM and PFM methods may under-predict the amount of airflow that leaves directly through the rear door or cooling coil because neither method explicitly models airflow momentum associated with the jet-like airflow pattern which issues from the rack mounted equipment. Similarly, buoyancy may tend to increase the amount of airflow leaving the top and top-rear of the rack either through door, cooling-coil, or leakage-path openings, particularly at low airflow rates. Without additional correction, both FNM and PFM methods may be unable to account for the effect of buoyancy.

To address this circumstance, some embodiments adjust or "tune" the various rack resistances to provide better agreement to the real CFD data. The end result is that the simple FNM and PFM models retain their speed and reliability advantages relative to CFD while providing results of comparable accuracy. Resistance values may be tuned based on the overall resistance area (e.g. the entire rear-door area) or resistances can be broken down into smaller pieces which are tuned individually for greater resolution and accuracy. For example, the rear-door resistance may be broken into 4 or more horizontal slices stacked together. As another example, the rack leakage resistance may be separated into a top and bottom resistances.

Resistance values depend primarily on server airflow rate but can also be tuned for other rack configuration parameters such as rack and server dimensions and power dissipation (which affects buoyancy). One adequate expression for the modified rear door or coil resistance is represented by Equation (21):

$$\alpha_{new}^{rear} = \alpha_{old}^{rear}\left(\frac{A_{old}}{A_{new}}\right)^2\left(1 - \frac{Q_s^{max}}{Q_{max}}\right) \quad (21)$$

where $\alpha^{rear}$ is the resistance of the real door or coil while the subscripts "new" and "old" indicate the resistance values before and after the modification. A is the area of the rear door or coil. $Q_{max}$ is the tuned fictitious maximum overall server airflow which will lead to a essentially zero resistance for the rear door or coil. When $Q_s^{max}$ is greater than $Q_{max}$, $\alpha_{new}^{rear}$ is taken as zero.

Figure 13:
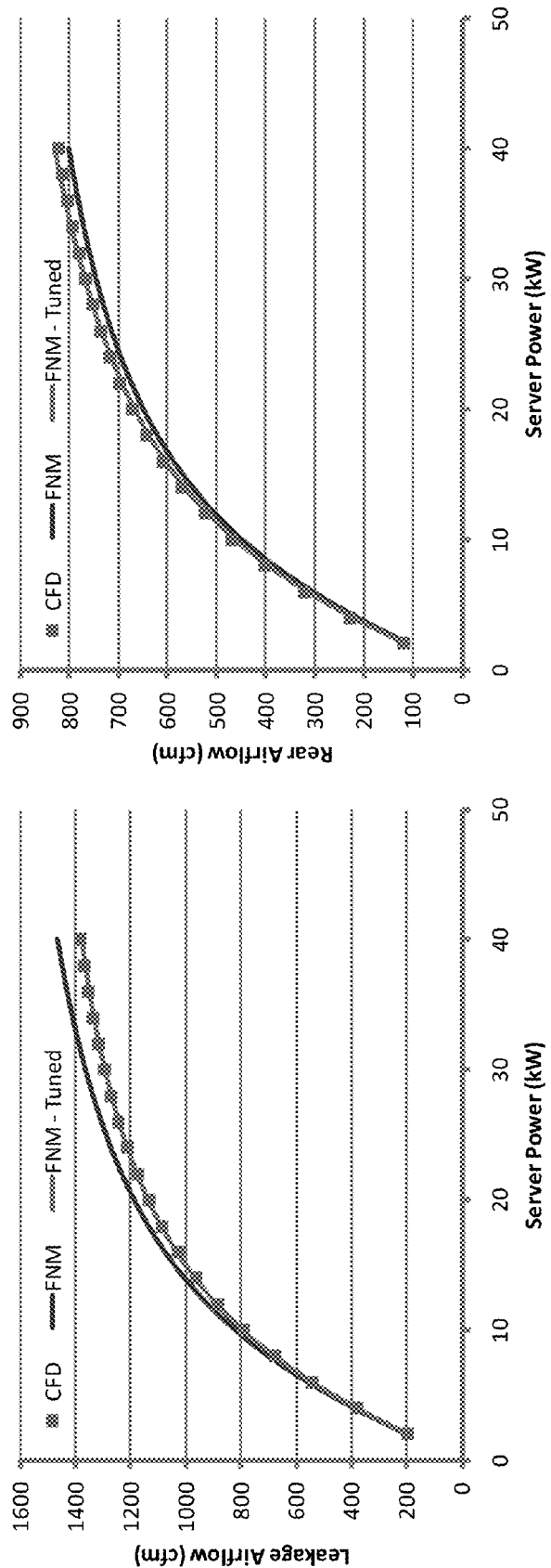
FIG. 13 illustrates performance data for a plurality of techniques for modeling server airflow.

FIG. 13 shows a comparison of leakage and rear-door airflow predictions by CFD, FNM and the FNM with tuned resistance values. In this test, the ΔT's across the racks were assumed to be fixed while the server power and airflow were varied from 2 to 40 kW and 320 cfm to 6400 cfm respectively. The server plane was sealed and the leakage paths through the top and bottom of the rack were left open. Also, rear-door cooling coils were used instead of standard doors. As illustrated on the FIG. 13, the airflows predicted by the FNM model showed clear difference from those predicted by CFD, with RMSE 58 cfm (4.9%) and 19 cfm (3.4%) for the leakage and rear airflow respectively. After the resistance values were tuned according to the server airflow rate, the FNM model showed much more accurate results, with RMSE 4 cfm (0.5%) and 4 cfm (0.8%) for the leakage and rear airflow respectively.

Embodiments described herein provide novel methods and systems for determining airflow through equipment racks in a data center. The ability to predict airflow accurately in a data center design or management tool in embodiments of the invention facilitates designing robust rack systems that exhibit good cooling performance under different layout configurations. Further, embodiments facilitate avoiding costly trial-and-error solutions in a facility in attempts to achieve particular cooling performance results. Still further, better accuracy in rack airflow predictions results in improved overall data center cooling analysis and can provide a more energy efficient cooling solution. In at least some embodiments described herein, airflow in a rack is described as being generated by inlets, outlets, equipment fans and leakages. Systems and methods described herein can be used with other types of sources of air in racks, including other types of cooling devices and fans. In at least some embodiments, methods are described as determining specific airflows. In at least some embodiments, the determination is a prediction or estimation of actual airflows.

In at least some embodiments of the invention discussed herein, the performance of assessments and calculations are occasionally referred to as "real-time". As referred to herein, "real-time" refers to processes that are completed in a matter of a few seconds or less rather than several minutes or longer. Such durations can happen with complex calculations, such as those involving typical CFD calculations.

In at least some embodiments described above, the design of a data center and/or actual parameters in a data center are altered based on predicted rack airflow in a data center. The alterations may be implemented to improve the cooling performance and/or may be implemented to provide cost and/or power savings when the performance is found to be within predetermined specifications. For example, the location of equipment racks may be changed and/or the types of racks or rack configurations may be changed. Further, based on determined airflow values, a data management system in accordance with one embodiment may control one or more CRACs or in-row cooling devices to adjust the airflow, and in addition, one or more equipment racks can be controlled to reduce power if the airflow from cooling providers is not adequate to provide sufficient cooling.

In at least some embodiments described above, tools and processes are provided for determining rack airflow in a data center. In other embodiments, the tools and processes may be used in other types of facilities, and may also be used in mobile applications, including mobile data centers. Further, processes and systems in accordance with embodiments described herein may be used in a wide variety of equipment racks having various inlets, outlets and internal structures. The terms inlet and outlet, as used herein, may include a single open area of a rack such as a vent, a group of vents closely spaced together to effectively act as one opening, or a single opening having many individual open areas.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for modeling cooling performance, the method comprising:
   receiving, by a computer, input data from a storage device, the input data including data related to physical structures within at least one equipment rack, wherein the physical structures provide resistance to airflow within the at least one equipment rack;
   selecting, based on the data related to physical structures, at least one first equation of a plurality of predetermined equations that describe pressure values in a plurality of spaces within the at least one equipment rack;
   determining pressure values in identified spaces of the plurality of spaces by solving the at least one first equation using the input data;
   determining airflow values between identified spaces by calculating a difference between the pressure values;
   storing, on the storage device, the airflow values as equipment rack airflow values within the at least one equipment rack;
   (A) determining a temperature value at an outlet of the at least one equipment rack based on the equipment rack airflow values and a temperature value at an inlet of the at least one equipment rack;
   (B) executing a room cooling performance model using the equipment rack airflow values and the temperature value at the outlet;
   (C) receiving, from the room cooling performance model, an updated temperature value at the inlet of the at least one equipment rack;
   (D) storing, on the storage device, the updated temperature value as the temperature value at the inlet;
   (E) determining whether a difference between the updated temperature value and a previous temperature value at the inlet is greater than a threshold; and
   (F) repeating acts (A) through (E) until the difference is not greater than the threshold.

2. The method according to claim 1, wherein receiving input data includes receiving input data describing at least one of a front door, a server plane, a rear door, a rear cooling coil and an inlet in the at least one equipment rack.

3. The method according to claim 1, wherein determining the pressure values includes determining pressure values in identified spaces adjacent to at least one server positioned within the at least one equipment rack.

4. The method according to claim 3, further comprising:
   determining a predicted airflow value for at least one fan of the at least one server based on the difference between the pressure values;
   determining a predicted value of power delivered to the at least one fan based on the predicted airflow value for the at least one fan;
   determining a predicted temperature value at an inlet of the at least one server based on an airflow value for leakage of ambient air into the at least one equipment rack; and
   providing the predicted airflow value, the predicted value of power and the predicted temperature value to an external entity.

5. The method according to claim 1, further comprising tuning the at least one equation to compensate for resistance values located within the at least one equipment rack.

6. The method according to claim 1, further comprising:
   (G) dividing the at least one equipment rack into a plurality of grid cells;
   (H) using a first iterative method based on the equipment rack airflow values, determine a value for airflow velocity for each of the grid cells;
   (I) determining an air pressure value in each of the identified spaces based on the airflow velocity;
   (J) using a second iterative method, determine new airflow values between the identified spaces based on the air pressure values in the identified spaces;
   (K) storing the new airflow values as the equipment rack airflow values within the at least one equipment rack;
   (L) determining whether differences between the new airflow values and previous airflow values is greater than a threshold; and
   (M) repeating acts (H) through (L) until the differences are not greater than the threshold.

7. The method according to claim 6, wherein act (J) includes determining whether airflows in the at least one equipment rack satisfy a mass balance equation.

8. A system for modeling cooling performance, the system including a memory and a processor coupled to the memory and being configured to:
   receive input data from a storage device, the input data including data related to physical structures within at least one equipment rack, wherein the physical structures provide resistance to airflow within the at least one equipment rack;
   select, based on the data related to physical structures, at least one first equation of a plurality of predetermined equations that describe pressure values in a plurality of spaces within the at least one equipment rack;
   determine pressure values in identified spaces of the plurality of spaces by solving the at least one first equation using the input data;
   determine airflow values between identified spaces by calculating a difference between the pressure values;
   store, on the storage device, the airflow values as equipment rack airflow values within the at least one equipment rack;
   (A) determine a temperature value at an outlet of the at least one equipment rack based on the equipment rack airflow values and a temperature value at an inlet of the at least one equipment rack;

(B) execute a room cooling performance model using the equipment rack airflow values and the temperature value at the outlet;

(C) receive, from the room cooling performance model, an updated temperature value at the inlet of the at least one equipment rack;

(D) store, on the storage device, the updated temperature value as the temperature value at the inlet;

(E) determine whether a difference between the updated temperature value and a previous temperature value at the inlet is greater than a threshold; and (F) repeat acts (A) through (E) until the difference is not greater than the threshold.

9. The system according to claim 8, wherein the input data describes at least one of a front door, a server plane, a rear door, a rear cooling coil and an inlet in the at least one equipment rack.

10. The system according to claim 8, wherein the identified spaces include spaces adjacent to at least one server positioned within the at least one equipment rack.

11. The system according to claim 10, wherein the system is further configured to:
   determine a predicted airflow value for at least one fan of the at least one server based on the difference between the pressure values;
   determine a predicted value of power delivered to the at least one fan based on the predicted airflow value for the at least one fan;
   determine a predicted temperature value at an inlet of the at least one server based on an airflow value for leakage of ambient air into the at least one equipment rack; and
provide the predicted airflow value, the predicted value of power and the predicted temperature value to an external entity.

12. The system according to claim 8, wherein the system is further configured to receive information that tunes the at least one equation to compensate for resistance values located within the at least one equipment rack.

13. The system according to claim 8, wherein the system is further configured to:
   (G) divide the at least one equipment rack into a plurality of grid cells;
   (H) execute a first iterative method based on the equipment rack airflow values to determine a value for airflow velocity for each of the grid cells;
   (I) determine an air pressure value in each of the identified spaces based on the airflow velocity;
   (J) execute a second iterative method to determine new airflow values between the identified spaces based on the air pressure values in the identified spaces;
   (K) store the new airflow values as the equipment rack airflow values within the at least one equipment rack;
   (L) determine whether differences between the new airflow values and previous airflow values is greater than a threshold; and
   (M) repeat acts (H) through (L) until the differences are not greater than the threshold.

14. The system according to claim 13, wherein at least one grid cell of the plurality of grid cells has a size different from a size of another grid cell of the plurality of grid cells and each of the plurality of grid cells has a size based on characteristics of the at least one equipment rack.

15. The system according to claim 13, wherein the system is further configured to determine whether airflows in the at least one equipment rack satisfy a mass balance equation.

16. A non-transitory computer readable medium having stored thereon sequences of instruction for modeling cooling performance including instructions that will cause at least one processor to:
   receive input data from a storage device, the input data including data related to physical structures within at least one equipment rack, wherein the physical structures provide resistance to airflow within the at least one equipment rack;
   select, based on the data related to physical structures, at least one first equation of a plurality of predetermined equations that describe pressure values in a plurality of spaces within the at least one equipment rack;
   determine pressure values in identified spaces of the plurality of spaces by solving the at least one first equation using the input data;
   determine airflow values between identified spaces by calculating a difference between the pressure values;
   store, on the storage device, the airflow values as equipment rack airflow values within the at least one equipment rack;
   (A) determine a temperature value at an outlet of the at least one equipment rack based on the equipment rack airflow values and a temperature value at an inlet of the at least one equipment rack;
   (B) execute a room cooling performance model using the equipment rack airflow values and the temperature value at the outlet;
   (C) receive, from the room cooling performance model, an updated temperature value at the inlet of the at least one equipment rack;
   (D) store, on the storage device, the updated temperature value as the temperature value at the inlet;
   (E) determine whether a difference between the updated temperature value and a previous temperature value at the inlet is greater than a threshold; and
   (F) repeat acts (A) through (E) until the difference is not greater than the threshold.

17. The computer readable medium according to claim 16, wherein the sequences of instruction include instructions that will cause the at least one processor to determine the pressure values by determining pressure values in identified spaces adjacent to at least one server positioned within the at least one equipment rack.

18. The computer readable medium according to claim 17, wherein the sequences of instruction include instructions that will cause the at least one processor to determine a predicted airflow value for at least one fan of the at least one server based on the difference between the pressure values.

* * * * *